(12) United States Patent
Gong et al.

(10) Patent No.: US 10,266,199 B2
(45) Date of Patent: Apr. 23, 2019

(54) ELECTRIC VEHICLE

(71) Applicant: SHENZHEN ZHILUN DRIVING TECHNOLOGY FOR ELECTRIC VEHICLE CO., LTD., Shenzhen, Guangdong (CN)

(72) Inventors: Shugang Gong, Guangdong (CN); Xingyin Wu, Guangdong (CN); Lei Peng, Guangdong (CN); Chaoping Feng, Guangdong (CN); Zhihua Wang, Guangdong (CN)

(73) Assignee: GUANGDONG HUA'CHAN RESEARCH INSTITUTE OF INTELLIGENT TRANSPORTATION SYSTEM CO., LTD, Shenzhen (CN)

( * ) Notice: Subject to any disclaimer, the term of this patent is extended or adjusted under 35 U.S.C. 154(b) by 83 days.

(21) Appl. No.: 15/300,652

(22) PCT Filed: Apr. 1, 2014

(86) PCT No.: PCT/CN2014/074560
§ 371 (c)(1),
(2) Date: Sep. 29, 2016

(87) PCT Pub. No.: WO2015/149288
PCT Pub. Date: Oct. 8, 2015

(65) Prior Publication Data
US 2017/0113716 A1   Apr. 27, 2017

(51) Int. Cl.
*B62D 21/00* (2006.01)
*B62D 5/04* (2006.01)
(Continued)

(52) U.S. Cl.
CPC ............ *B62D 5/0472* (2013.01); *B60G 1/00* (2013.01); *B60J 9/02* (2013.01); *B60K 1/04* (2013.01);
(Continued)

(58) Field of Classification Search
CPC .... B62D 5/0472; B62D 21/152; B62D 21/02; B60K 7/0007; B60K 2007/0038
See application file for complete search history.

(56) References Cited

U.S. PATENT DOCUMENTS

| 4,113,047 A | 9/1978 | Turner |
| 6,378,637 B1 * | 4/2002 | Ono ........................ B60K 1/04 180/65.31 |

(Continued)

FOREIGN PATENT DOCUMENTS

| CN | 2863536 Y | 1/2007 |
| CN | 101722865 A | 6/2010 |

(Continued)

OTHER PUBLICATIONS

International Search Report, dated Sep. 29, 2014, PCT/CN2014/074560 with English translation (7 pages).

*Primary Examiner* — Kevin Hurley
*Assistant Examiner* — Michael R Stabley
(74) *Attorney, Agent, or Firm* — Hamre, Schumann, Mueller & Larson, P.C.

(57) ABSTRACT

Disclosed is an electric vehicle, comprising a chassis (1), a vehicle body and a power battery (71), wherein the chassis (1) comprises a frame system (2), a steering motor damping system (13) mounted on the frame system (2), a wheel system (12) connected to the steering motor damping system (13), a steering system (3) mounted on the frame system (2), and a braking system (4) mounted on the frame system (2); and the wheel system (12) comprises a left front wheel (121)

(Continued)

using a hub motor, a left rear wheel (123) using a hub motor, a right front wheel (122) using a hub motor, and a right rear wheel (124) using a hub motor. Driving the wheels (121, 122, 123, 124) with the hub motors can omit a traditional mechanical transmission system, so as to simplify the structure of the chassis (1) and reduce the weight of the chassis (1). Compared with a traditional electric vehicle, the electrical vehicle has a lighter weight, smaller volume, reduced mechanical transmission loss, and improved electrical energy utilization rate.

26 Claims, 19 Drawing Sheets

(51) Int. Cl.

| | | |
|---|---|---|
| *B60G 1/00* | (2006.01) | |
| *B60W 10/00* | (2006.01) | |
| *B60K 1/04* | (2019.01) | |
| *B60K 7/00* | (2006.01) | |
| *B60K 17/356* | (2006.01) | |
| *B62D 21/02* | (2006.01) | |
| *B62D 25/20* | (2006.01) | |
| *B62D 29/00* | (2006.01) | |
| *B60J 9/02* | (2006.01) | |
| *B62D 21/15* | (2006.01) | |
| *B62D 25/04* | (2006.01) | |

(52) U.S. Cl.
CPC .......... *B60K 7/0007* (2013.01); *B60K 17/356* (2013.01); *B60W 10/00* (2013.01); *B62D 5/0451* (2013.01); *B62D 21/00* (2013.01); *B62D 21/02* (2013.01); *B62D 21/152* (2013.01); *B62D 25/20* (2013.01); *B62D 29/008* (2013.01); *B60K 2007/0038* (2013.01); *B60L 2220/44* (2013.01); *B60L 2220/46* (2013.01); *B60L 2260/28* (2013.01); *B60Y 2304/03* (2013.01); *B60Y 2304/05* (2013.01); *B62D 25/04* (2013.01); *Y02T 10/7258* (2013.01)

(56) References Cited

U.S. PATENT DOCUMENTS

| | | | | |
|---|---|---|---|---|
| 7,292,992 | B2 * | 11/2007 | Chernoff | B60G 7/003 705/26.1 |
| 7,441,615 | B2 * | 10/2008 | Borroni-Bird | B60G 3/18 180/58 |
| 7,951,483 | B2 * | 5/2011 | Onuki | H01M 2/1016 320/116 |
| 8,056,928 | B2 * | 11/2011 | Ijaz | B60K 15/013 280/830 |
| 8,282,275 | B2 * | 10/2012 | Akaboshi | H01M 2/1077 320/134 |
| 8,710,800 | B2 * | 4/2014 | Gibbs | H01M 10/441 320/116 |
| 2006/0027406 | A1 * | 2/2006 | Borroni-Bird | B60K 1/04 280/831 |
| 2006/0048994 | A1 * | 3/2006 | Young | B60G 3/18 180/402 |
| 2009/0267337 | A1 * | 10/2009 | Siekaup | B62D 21/02 280/781 |

FOREIGN PATENT DOCUMENTS

| | | | | |
|---|---|---|---|---|
| CN | 201670260 U | | 12/2010 | |
| CN | 203094172 | * | 7/2013 | .............. B60G 3/20 |
| CN | 203094172 U | | 7/2013 | |
| JP | 2005014721 A | | 1/2005 | |

* cited by examiner

ELECTRIC VEHICLE

FIELD OF THE INVENTION

The present invention relates to the technical field of vehicle, and more particularly relates to an electric vehicle.

BACKGROUND OF THE INVENTION

Power transmission of existing electric vehicles generally still adopts conventional mechanical transmission (e.g., a reducer). However, mechanical transmission not only has a low efficiency and a great energy consumption loss in a transmission process, but also results in a large whole weight and a large volume of a vehicle.

SUMMARY OF THE INVENTION

A purpose of the present invention is to provide an electric vehicle, which aims at solving the problem in the prior art that an electric vehicle adopts mechanical transmission which has a great energy consumption loss and results in a large whole weight and a large volume of the vehicle A technical solution of the present invention is as follows: an electric vehicle, comprising a chassis, a vehicle body arranged on the chassis, and a power battery arranged on the chassis and configured to provide electric power; wherein the chassis comprises a frame system, a steering motor damping system mounted on the frame system, a wheel system connected to the steering motor damping system, a steering system mounted on the frame system, and a braking system mounted on the frame system;

the wheel system comprises a left front wheel using a hub motor, a left rear wheel using a hub motor, a right front wheel using a hub motor, and a right rear wheel using a hub motor;

the steering motor damping system includes a left front steering damping motor, a right front steering damping motor, a left rear steering damping motor, and a right rear steering damping motor; the left front steering damping motor and the right front steering damping motor are respectively mounted at left and right sides of a front end of the frame system, and the left rear steering damping motor and the right rear steering damping motor are respectively mounted at left and right sides of a rear end of the frame system;

the left front wheel is connected with the left front steering damping motor; the right front wheel is connected with the right front steering damping motor; the left rear wheel is connected with the left rear steering damping motor; and the right rear wheel is connected with the right rear steering damping motor.

The electric vehicle provided by the present invention directly drives the wheels with the hub motors so as to travel, omits a traditional mechanical transmission system, simplifies the structure of the chassis, reduces the weight of the chassis, and further reduces the mechanical transmission loss, such that the electric power utilizing efficiency of the vehicle is greatly increased. Steering of the left front wheel, the right front wheel, the left rear wheel, and the right rear wheel are respectively adjusted by the left front steering damping motor, the right front steering damping motor, the left rear steering damping motor, and the right rear steering damping motor, and thus the rotation of each of the wheels can be adjusted flexibly. That is, steering and travelling of the electric vehicle provided by the present invention can be controlled by direct actions of the hub motors and the steering motors, power does not need to be transmitted by a transmission device; therefore, compared with electric vehicles using transmission, the electric vehicle will have a less weight and a less volume.

BRIEF DESCRIPTION OF THE DRAWINGS

FIG. 1 is a bottom schematic view of the frame system of the electric vehicle of FIG. 1;

DETAILED DESCRIPTION OF THE PREFERRED EMBODIMENT

In order to make the purposes, technical solutions, and advantages of the present invention be clearer, the present invention will be further described in detail hereinafter with reference to accompany drawings and embodiments. It should be understood that the specific embodiments described here are only intended to illustrate the present invention, but not to limit the present invention.

Figure 1:
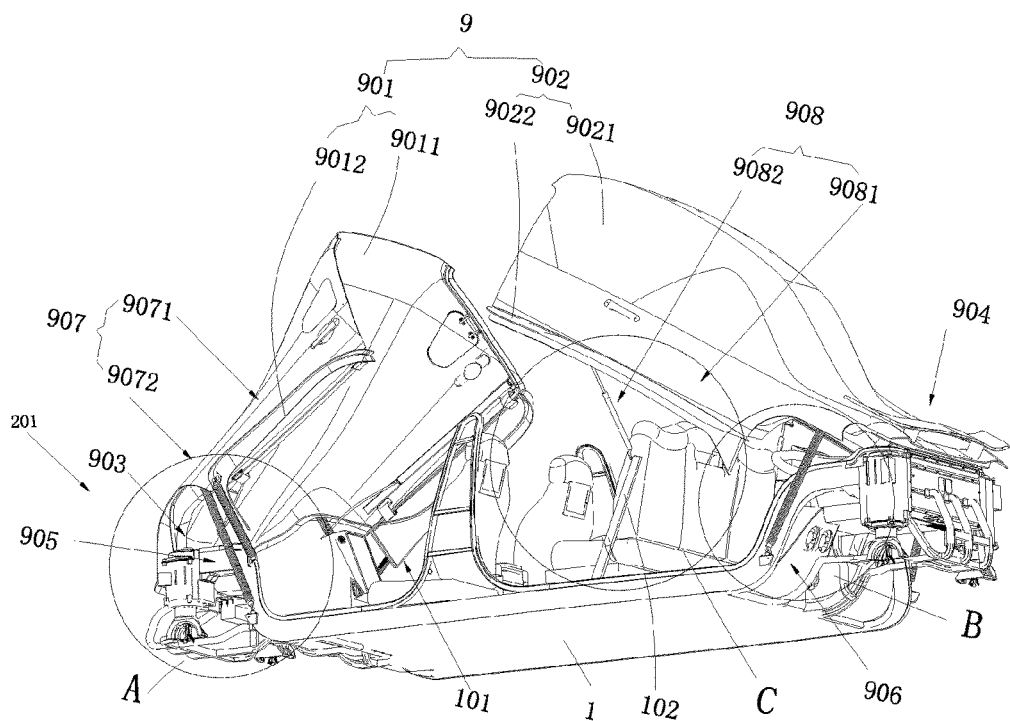
FIG. 1 is a perspective schematic view of an electric vehicle provided by an embodiment of the present invention.
Figure 2:
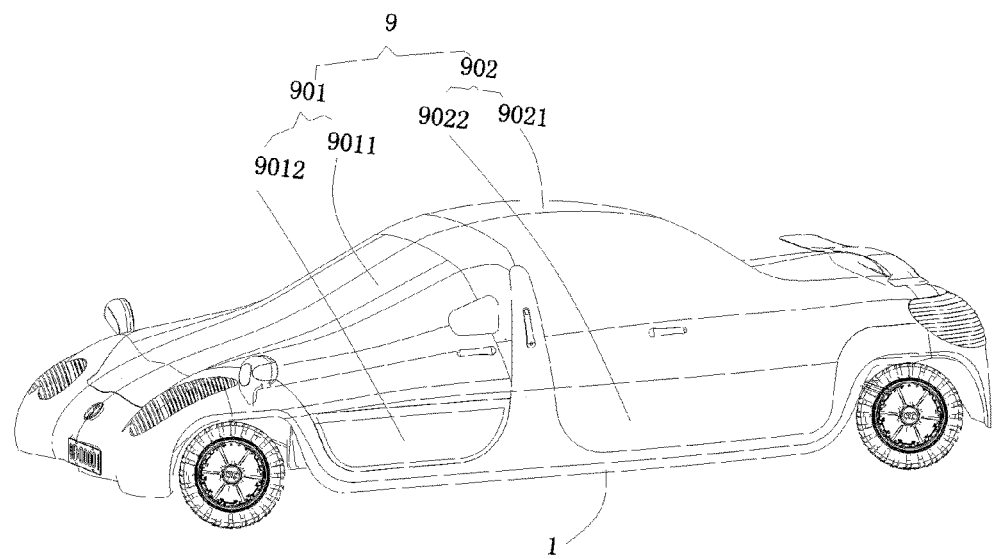
FIG. 2 is a schematic view of a closed vehicle door of the electric vehicle of FIG. 1.
Figure 3:
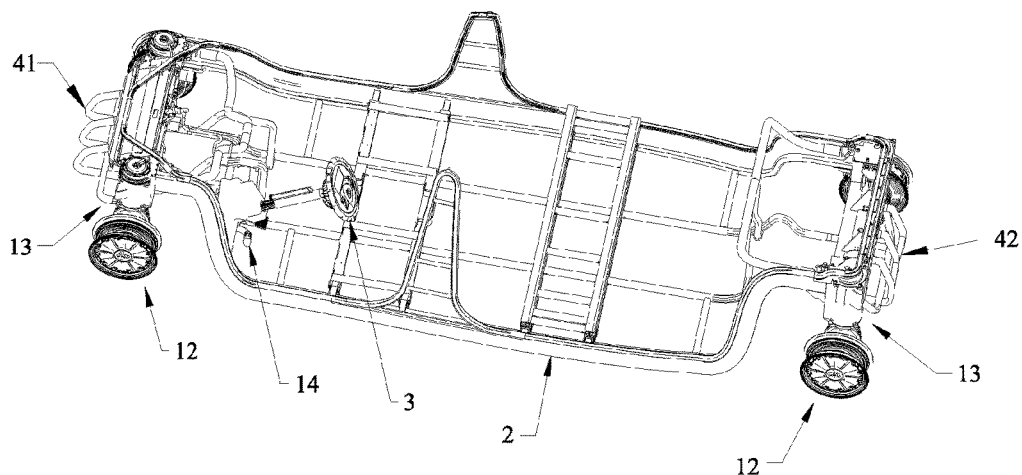
FIG. 3 is a perspective structural schematic view of a chassis of the electric vehicle of FIG. 1.

FIG. 1 and FIG. 2 show exemplary drawings of an electric vehicle provided by an embodiment of the present invention. The electric vehicle comprises a chassis 1, a vehicle body 2 arranged on the chassis 1, and a power battery arranged on the chassis 1 and configured to provide electric power.

Particularly, as shown in FIG. 3 to FIG. 7, the chassis 1 includes a frame system 2, a steering motor damping system 13, a wheel system 12 connected with the steering motor damping system 13, a steering system 3 mounted on the frame system 2, and a braking system 14 mounted on the frame system 2. The wheel system 12 includes a left front wheel 121 using a hub motor, a left rear wheel 123 using a hub motor, a right front wheel 122 using a hub motor, and a right rear wheel 124 using a hub motor. The steering motor damping system 13 includes a left front steering damping motor 131, a right front steering damping motor 133, a left rear steering damping motor 135, and a right rear steering damping motor 137. The left front steering damping motor 131 and the right front steering damping motor 133 are respectively mounted at left and right sides of a front end of the frame system 2, and the left rear steering damping motor 135 and the right rear steering damping motor 137 are respectively mounted at left and right sides of a rear end of the frame system 2. The left front wheel 121 is connected with the left front steering damping motor 131; the right front wheel 122 is connected with the right front steering damping motor 133; the left rear wheel 123 is connected with the left rear steering damping motor 135; and the right rear wheel 124 is connected with the right rear steering damping motor 137.

By using the left front wheel 121, the right front wheel 122, the left rear wheel 123, and the right rear wheel 124 having the hub motors, that is, driving the wheels with the hub motors, to travel, conventional mechanical transmission systems are omitted, the structure of the chassis 1 is simplified, the weight of the chassis 1 is reduced, and the mechanical transmission loss is also reduced, such that the electric power utilizing efficiency of the vehicle is greatly increased. Steering of the left front wheel 121, the right front wheel 122, the left rear wheel 123, and the right rear wheel 124 are respectively adjusted by the left front steering damping motor 131, the right front steering damping motor 133, the left rear steering damping motor 135, and the right rear steering damping motor 137, and thus the rotation of each of the wheels can be adjusted flexibly. The hub motors can adopt existing hub motors, for example, a hub motor disclosed by the patent application with the published No. WO 2013107040A1. Steering and travelling of the electric vehicle provided by the present invention can be controlled by direct actions of the hub motors and the steering motors, power does not need to be transmitted by a transmission device; therefore, compared with electric vehicles using transmission, the electric vehicle has a less weight and a less volume.

Figure 5:
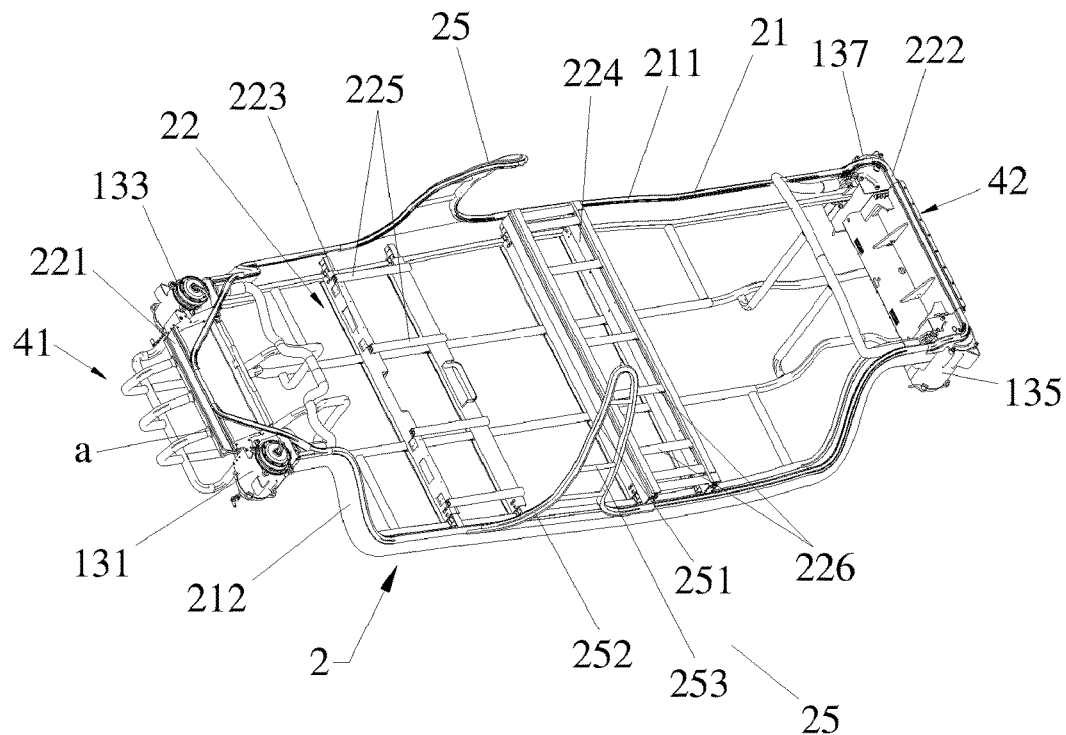
FIG. 5 is a perspective schematic view of a frame system of the electric vehicle of FIG. 1, wherein a front anti-collision system, a rear anti-collision system, and a steering motor damping system are also shown.
Figure 6:
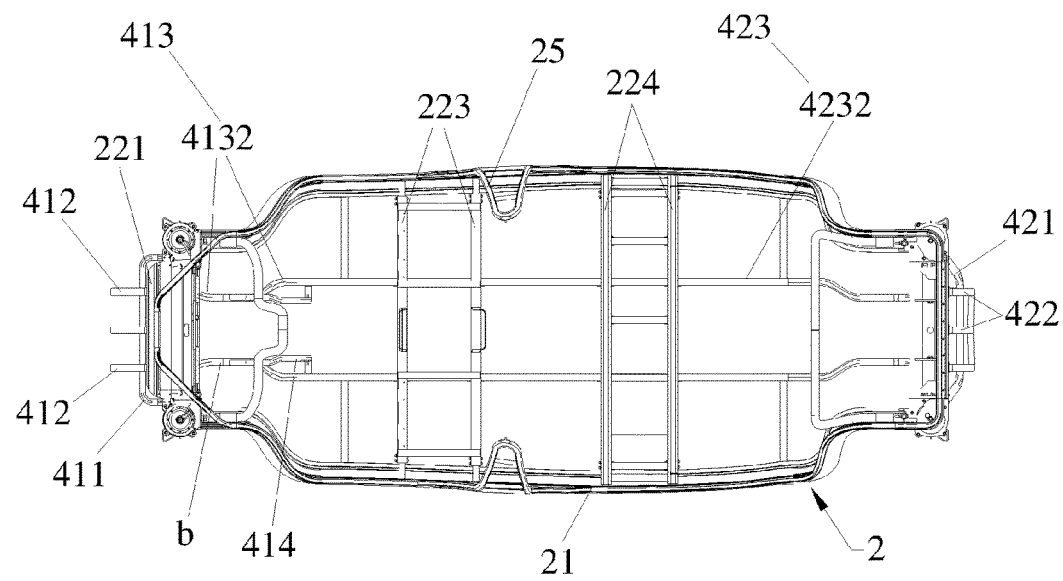
FIG. 6 is a top schematic view of the frame system of the electric vehicle of FIG. 1.
Figure 7:
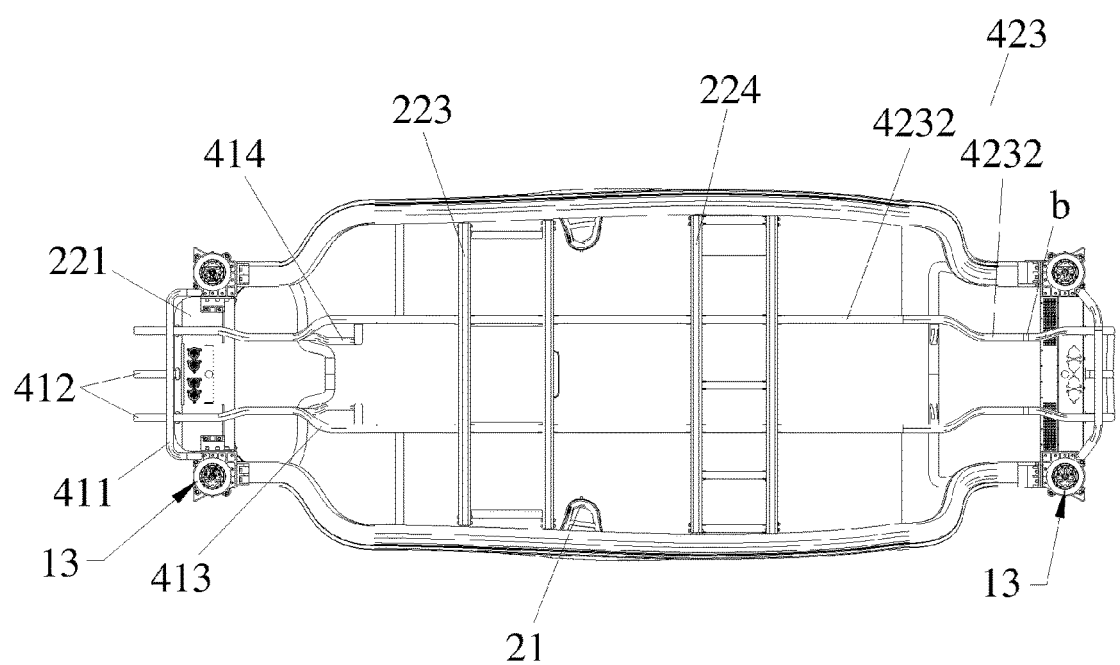

As shown in FIG. 5 to FIG. 7, the frame system 2 includes two multi-cavity box-type stringers 21 made of aluminum alloy material and arranged spacedly and symmetrically, and a multi-cavity crossbeam assembly 22 made of aluminum alloy material and connected between the two multi-cavity box-type stringers 21. Specifically, the inside of each multi-cavity box-type stringer 21 has a plurality of independent cavities, the multi-cavity crossbeam assembly 22 includes a plurality of crossbeams, and the inside of each crossbeam has a plurality of independent cavities. Sections of the cavities in the multi-cavity box-type stringers 21 and the crossbeams can be shaped as rectangular, circular, polygonal, and so on. The multi-cavity box-type stringers 21 and the multi-cavity crossbeam assembly 22 cooperatively form a supporting structure of the vehicle body of the electric vehicle to bear the whole vehicle body, and the plurality of independent cavities arranged in the multi-cavity box-type stringers 21 and the multi-cavity crossbeam assembly 22 can not only reduce the whole weight of the frame but also serve as cable passages and vent pipes of the electric vehicle or further oil pipelines of the electric vehicle.

The frame system 2 provided by the present invention further includes at least one B-pillar retaining frame 25 arranged at middle portions of the multi-cavity box-type stringers 21, wherein the B-pole retaining frame 25 is configured to fix a B-pillar of the electric vehicle. There are two B-pillar retaining frames 25, which are respectively arranged at middle portions of the two multi-cavity box-type stringers 21. The frame system 2 provided by the present invention is only provided with the B-pillar retaining frames, but is not provided with retaining frames configured to fix front pillars and retaining frames configured to fix rear pillars, therefore, the frame system 2 is simpler than frame structures of conventional electric vehicles. Specifically, each multi-cavity box-type stringer 21 includes a middle section 211 and bent sections 212 arranged at two ends of the middle section 211; the middle section 211 can be in a straight status, and can also be in an arc-shape slightly protruding upwards. When the middle section 211 is in the arc-shape slight protruding upwards, the trafficability of the electric vehicle will be better, and thus a comfortable travelling environment can be provided to users. Each bent section 212 is bent towards an inclined top of relative inner sides of the two multi-cavity box-type stringers 21 from the middle section 211, thereby facilitating the mounting and reception of the wheels.

The frame system 2 provided by the present invention adopts aluminum alloy material to make the multi-cavity box-type stringers 21 and the multi-cavity crossbeams, which can not only form the supporting structure configured to support the vehicle body of the electric vehicle but also reduce the whole weight of the frame. Moreover, the frame system 2 is simple in structure and easy to be machined and shaped, and thus can greatly simplify the manufacturing procedures and reduce the manufacturing cost. Furthermore, since the multi-cavity box-type stringers 21 and the crossbeams are provided therein with a plurality of independent cavities, they can serve as cable passages, vent pipes, or oil pipelines of the electric vehicle; thus, it is unnecessary to specially provide various passages, such as cable passages, such that the whole structure of the electric vehicle is simplified, assembly and manufacture of the electric vehicle are simpler, and the manufacture cost is reduced.

The crossbeams include a front crossbeam 221 arranged at front ends of the two multi-cavity box-type stringers 21, a rear crossbeam 222 arranged at rear ends of the two multi-cavity box-type stringers 21, at least one middle crossbeam 223 arranged at middle parts of the two multi-cavity box-type stringers 21, and at least one combined crossbeam 224; that is, both the middle crossbeam 223 and the combined crossbeam 224 are connected to the middle section 211 of each multi-cavity box-type stringer 21, the front crossbeam 221 and the rear crossbeam 222 are respectively connected to the bent sections 212 at two ends of each multi-cavity box-type stringer 21, these crossbeams are all arranged between the two multi-cavity box-type stringers 21, and cooperate with the two multi-cavity box-type stringers 21 to form a main bearing structure of the trapezoidal frame system 2 configured to bear components such as the vehicle body. Particularly, there can be two middle crossbeams 223 arranged spacedly, and there can be two combined crossbeams 224 arranged spacedly. Furthermore, in order to make seats of the electric vehicle get a stable support, the middle crossbeam 223 and the combined crossbeam 224 can be respectively arranged at positions of the electric vehicle where front seats and rear seats are respectively mounted, such that a stable support can be provided to the seats. The left front steering damping motor 131 and the right front steering damping motor 133 are respectively mounted at two opposite ends of the front crossbeam 221, and the left rear steering damping motor 135 and the right rear steering damping motor 137 are respectively mounted at two opposite ends of the rear crossbeam 222.

In order to improve the cushioning and shock-absorbing capability of the front crossbeam 221 and the rear crossbeam 222, both the front crossbeam 221 and the rear crossbeam 222 can be designed as multi-cavity structures, that is, each of the front crossbeam 221 and the rear crossbeam 222 are provided therein with a plurality of independent cavities.

In order to enhance the structural strengths of the two middle crossbeams 223 and improve the structural stability of the whole frame system 2, a plurality of first enhancing connection rods 225 can be arranged between the two middle crossbeams 223 so as to enhance the whole stability of the middle crossbeams 223 and the frame system 2. Each of the first enhancing connection rods 225 can also be manufactured as a multi-cavity structure.

Similarly, a plurality of second enhancing connecting rods 226 can be arranged between the two combined crossbeams 224 so as to enhance the whole stability of the middle crossbeams 223 and the frame system 2.

Figure 8:
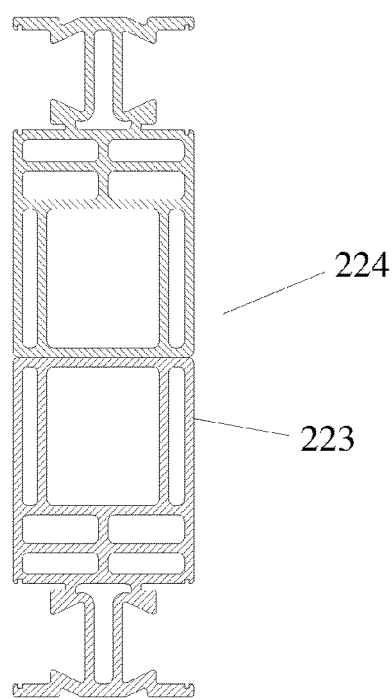
FIG. 8 is a schematic view of a section of a combined beam of the frame system of the electric vehicle of FIG. 1.

As shown in FIG. 8, the combined crossbeam 224 can be formed by two overlapping middle crossbeams 223, and the combined crossbeam 224 is an axisymmetrical structure. In this way, the combined crossbeam 224 will also be provided therein with a plurality independent cavities, and can also serve as cable passages, vent pipes, air pipes, oil pipelines, and so on.

The B-pillar retaining frame 25 includes a U-shaped main body 251 and two arch portions 252 arranged at two ends of the U-shaped main body 251 respectively, both the two arch portions 252 are bent outwards, and the two arch portions 252 are connected to the multi-cavity box-type stringers 21. The B-pillar retaining frame 25 is configured to fix a middle pillar of the electric vehicle. A middle portion of the U-shaped main body 251 is provided with at least one reinforce rib 253 so as to improve the strength and structural stability of the B-pillar retaining frame 25. The frame system 2 provided by the present invention only provides the B-pillar retaining frame 25 to fix the middle pillar, but does not provide other retaining frames configured to fix the front pillar and the rear pillar. The frame system 2 is simpler in structure and easier to be manufactured and assembled.

The chassis 1 further includes a front anti-collision system 41 arranged at front ends of the multi-cavity box-type stringers 21, the front anti-collision system 41 includes a front cross rod 411 connected with the front crossbeam 221 and a front bumper 412 of which two ends are respectively connected with the front cross rod 411 and the front crossbeam 221. The front bumper 412 is curved, and the front bumper 412 is arranged to be perpendicular to each of the front crossbeam 221 and the front cross rod 411. The front bumper 412 is arranged to protrude outwards relative to the front cross rod 411, such that an external force will impact the front bumper 412 first when a collision happens. Furthermore, the front bump 412 can also be designed as a rod with a multi-cavity structure, thereby improving its cushioning and anti-collision capability. Furthermore, a front damping cushion (not shown in the drawings) is mounted on a relatively inner side of the front bumper 412. By the arrangement of the front damping cushion, the anti-collision capability of the chassis 1 is improved. The power battery can also be arranged behind the front damping cushion, so that the power battery is protected by the front damping cushion.

In order to further improve the anti-collision capability of the front bumper 412, an end of the front bumper 412 can be connected to the front crossbeam 221 via a shock-absorbing ring a, and at least one first longitudinal rod 413 is arranged between the front cross rod 411 and the middle crossbeam 223. In this embodiment, there are two first longitudinal rods 413. Each first longitudinal rod 413 is provided with a first vertical pole 414 so as to improve the structural connection strength. In particular, each first longitudinal rod 413 can be formed by two half longitudinal rods 4132, and at least one shock-absorbing plastic column b can be adopted to form a transition connection between the two half longitudinal rods 4132, thereby improving the anti-collision capability of the front bumper 412.

The chassis 1 further includes a rear anti-collision system 42 arranged at rear ends of the multi-cavity box-type stringers 21, the rear anti-collision system 42 includes a rear cross rod 421 connected with the rear crossbeam 222 and a rear bumper 422 of which two ends are respectively connected with the rear cross rod 421 and the rear crossbeam 222. The rear bumper 412 is curved, and the rear bumper 412 is arranged to be perpendicular to each of the rear crossbeam 222 and the rear cross rod 421. The rear bumper 422 is arranged to protrude outwards relative to the rear cross rod 421, such that an external force will impact the rear bumper 422 first when a rear portion of the electric vehicle encounters a collision. Similarly, the rear bump 422 can also be designed as a rod with a multi-cavity structure, thereby improving its cushioning and anti-collision capability. Furthermore, a rear damping cushion (not shown in the drawings) is mounted at a relative inside of the rear bumper 422. By the arrangement of the rear damping cushion, the anti-collision capability of the chassis 1 is improved. The power battery can also be arranged in front of the rear damping cushion, so that the power battery is protected by the rear damping cushion.

In this embodiment, both the front bumper 412 and the rear bumper 422 can be designed to be in a built-in type, that is, both the front bumper 412 and the rear bumper 422 are arranged inside the casing of the electric vehicle.

The present invention can use four groups of power batteries. As long as any one group of power batteries does not malfunction, the vehicle can travel normally. Thus, the reliability of the power battery module is improved, and the error-tolerant rate of the power-off disable mode of the vehicle is also greatly improved.

In order to further improve the anti-collision capability of the rear bumper 422, an end of the rear bumper 422 can also be connected to the rear crossbeam 222 via a shock-absorbing ring a (not shown in the drawings), and at least one second longitudinal rod 423 is arranged between the rear cross rod 421 and the combined crossbeam 224. In this embodiment, there are two second longitudinal rods 423. Each second longitudinal rod 423 is provided with a second vertical pole 424. Furthermore, each second longitudinal rod 423 can be formed by two half longitudinal rods 4232, and at least one shock-absorbing plastic column b can be adopted to form a transition connection between the two half longitudinal rods 4232, thereby improving the anti-collision capability of the rear bumper 422. Similarly, each second longitudinal rod 423 can be manufactured as a multi-cavity structure, and sections of cavities of each second longitudinal rod 423 can be similar to that of the front bumper 421 and the rear bumper 422.

Figure 4:
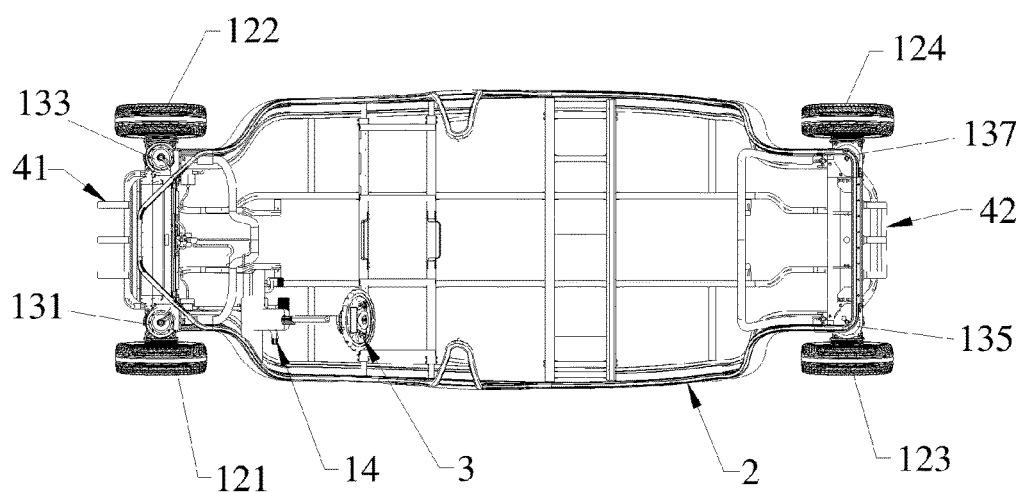
FIG. 4 is a top structural schematic view of the chassis of the electric vehicle of FIG. 1.
Figure 9:
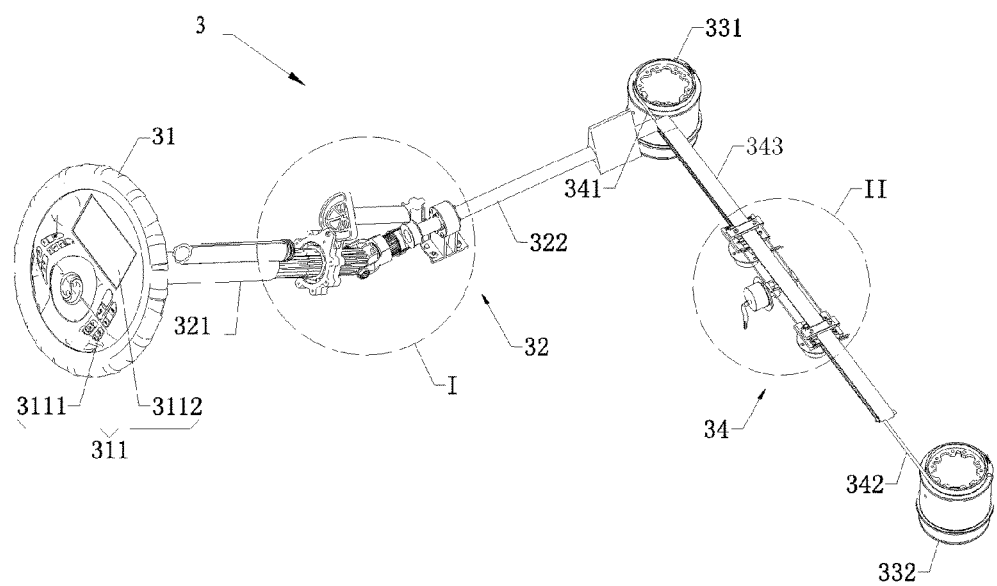
FIG. 9 is a top perspective view of a steering system in the chassis of the electric vehicle of FIG. 1.
Figure 10:
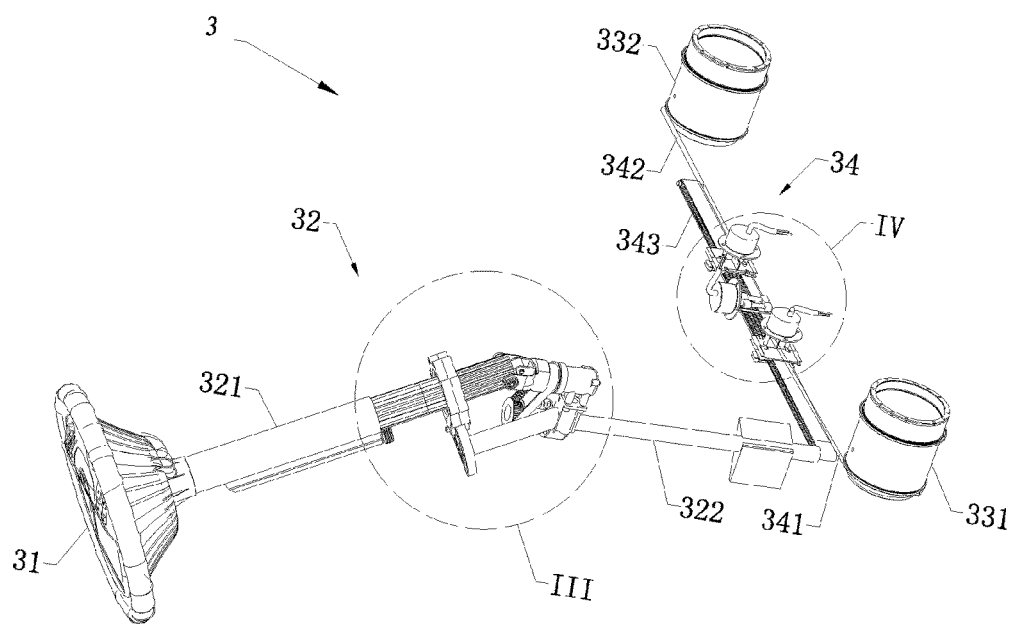
FIG. 10 is a bottom perspective view of the steering system of FIG. 9.

Referring to FIG. 4, FIG. 9, and FIG. 10, the steering system 3 is configured to control steering of the left front wheel 121 and the right front wheel 122 of the vehicle, and includes a steering wheel 31, a steering transmission device 32 configured to transmit a rotation angle of the steering wheel 31, a left rotating wheel 331 configured to adjust a rotation angle of the left front wheel 121, a right rotating wheel 332 configured to adjust a rotation angle of the right front wheel 122, and a steering device 34 configured to control rotation angles of the left rotating wheel 331 and the right rotating wheel 332. The left rotating wheel 331 is connected to the left front steering damping motor 131, and the right rotating wheel 332 is connected to the right front steering damping motor 133. In this embodiment, the left rotating wheel 331 is mounted in the left front steering damping motor 131, and the right rotating wheel 332 is mounted in the right front steering damping motor 133.

The steering wheel 31 is connected to one end of the steering transmission device 32, another end of the steering transmission device 32 engages with the steering device 34, and the left rotating wheel 331 and the right rotating wheel 332 are respectively located at two ends of the steering device 34.

The steering device 34 includes a left wirerope 341, a right wirerope 342, and a synchronous belt 343 driven by the steering transmission device 32 to rotate. Two ends of the left wirerope 341 are respectively coiled on the left rotating wheel 331 and the synchronous belt 343, and two ends of the right wirerope 342 are respectively coiled on the right rotating wheel 332 and the synchronous belt 343.

When the steering wheel 31 is rotated, the rotation angle of the steering wheel 331 is transmitted to the synchronous belt 343 by the steering transmission device 32, the synchronous belt 43 drives the left wirerope 341 and the right wirerope 342 to transmit simultaneously, and the left wirerope 341 and the right wirerope 342 adjust the rotation angles of the left front wheel 121 and the right front wheel 122 respectively and simultaneously.

The present invention mounts the steering device 34 in the front crossbeam 221 so as to utilize the front crossbeam 221 to protect the steering device 34. In other embodiments, the steering device 34 can also be mounted outside the front crossbeam 221.

In the present invention, the synchronous belt 343 cooperates with the steering transmission device 32. By artfully utilizing the wireropes (i.e., the left wirepole 341 and the right wirepole 342) and the method for coiling the wirepoles, the left rotating wheel 331 and the right rotating wheel 332 are driven to rotate accurately, and the rotation angles of the left front wheel 121 and the right front wheel 122 are respectively accurately control by the left rotating wheel 331 and the right rotating wheel 332. Furthermore, the present invention can further achieve a reverse transmission effect, as an existing steering system 3. The present invention has a simple structure, a low manufacturing difficulty, low manufacturing cost, a high accuracy, is convenient for the assembly of the vehicle and its wheels (or hubs), and is very applicable to electric vehicles.

Figure 12:
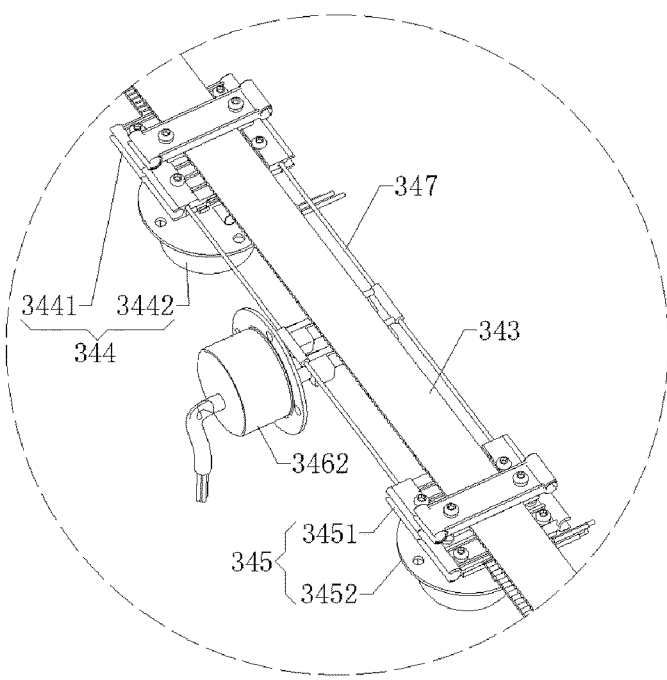
FIG. 12 is a partially enlarged view of the part II of FIG. 9.
Figure 14:
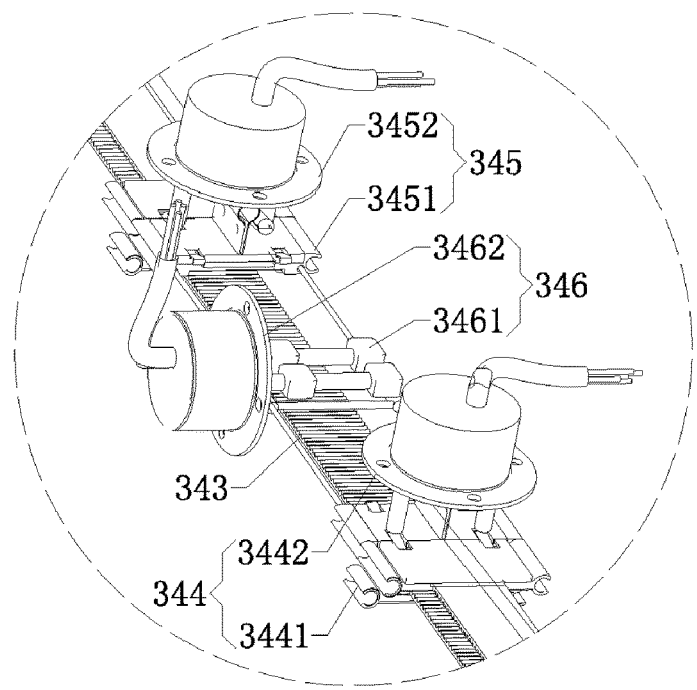
FIG. 14 is a partially enlarged view of the part IV of FIG. 10.

Referring to FIG. 12 and FIG. 14, the steering device 34 further includes a left synchronous belt lock member 344 configured to clamp the left wirerope 341 on the synchronous belt 343 or release the left wirerope 341 from the synchronous belt 343, and a right synchronous belt lock member 345 configured to clamp the right wirerope 342 on the synchronous belt 343 or release the right wirerope 342 from the synchronous belt 343. Both the left synchronous belt lock member 344 and the right synchronous belt lock member 345 are arranged on the synchronous belt 343. The steering wheel 31 is provided thereon with a control device configured to control the left synchronous belt lock member 344 and the right synchronous belt lock member 345. When the vehicle is normally used (i.e., runs forwards), the left synchronous belt lock member 344 and the right synchronous belt lock member 345 fix and clamp the left wirerope 341 and the right wirerope 342 on the synchronous belt 343 respectively. In this way, the present invention can be controlled to steer as a conventional vehicle. When the steering wheel 31 rotates, by the transmission using the synchronous belt 343 to drive the wireropes, steering of the wheels are controlled indirectly and accurately. When the vehicle needs to be used unconventionally (for example, runs transversely by an angle of 90 degrees), a driver can operate the control device on the steering wheel 31, such that the left synchronous belt lock member 344 and the right synchronous belt lock member 345 release the left wirerope 341 and the right wirerope 342 from the synchronous belt 343 respectively. At this time, the wireropes are not driven by the synchronous belt 343. The control device, by means of a program control, makes the left front wheel 121 and the right front wheel 122 spread outwards respectively, and finally form an included angle of 180 degrees, that is, the left front wheel 121 and the right front wheel 122 are positioned at the same straight line. It can be seen that the vehicle can run transversely at this time, such a running mode is very applicable to parking, and is particularly applicable to a narrow parking space. When the transverse running is completed, the left front wheel 121 and the right front wheel 122 are returned to their original positions by the control device, the left synchronous belt lock member 344 and the right synchronous belt lock member 345 clamp the wireropes again, and thus the normal driving status can be resumed.

Further referring to FIG. 12 and FIG. 14, as a specific embodiment of the present invention regarding the left synchronous belt lock member 344 and the right synchronous belt lock member 345, the left synchronous belt lock member 344 includes a left clamping block 3441 that can clamp the left wirerope 341 on the synchronous belt 343 and a left electromagnet 3442 configured to control the clamping and releasing statuses of the left clamping block 3441, and the left electromagnet 3442 is arranged on the left clamping block 3441; the right synchronous belt lock member 345 includes a right clamping block 3451 that can clamp the right wirerope 342 on the synchronous belt 343 and a right electromagnet 3452 configured to control the clamping and releasing statuses of the right clamping block 3451, and the right electromagnet 3452 is arranged on the right clamping block 3451. The effect of clamping and releasing the wireropes is achieved by the clamping blocks cooperating with the electromagnets, the applying method is simple and easy to achieve.

In particular, the steering device 34 further includes a middle lock member 346 that can control distances to the left synchronous belt lock member 344 and the right synchronous belt lock member 345 simultaneously. The middle lock member 346 is arranged on the synchronous belt 343 and located between the left synchronous belt lock member 344 and the right synchronous belt lock member 345, and both the left synchronous belt lock member 344 and the right synchronous belt lock member 345 are connected to the middle lock member 346 via a middle wirerope 347. In this embodiment of the present invention, the middle lock member 346 can not only control the distances to the left synchronous belt lock member 344 and the right synchronous belt lock member 345 but also perform an operation control for the wireropes, for example, indirectly control the rotation angles of the left rotating wheel 331 and the right rotating wheel 332, and thus plays an important role in a transition process between the aforesaid conventional travelling and transverse travelling.

Referring to FIG. 14, as a specific embodiment of the middle lock member 346, the middle lock member 346 includes a scroll 3461 and a middle electromagnet 3462, the middle electromagnet 3462 is arranged on the scroll 3461, and the middle wirerope 347 is coiled on the scroll 3461.

Figure 11:
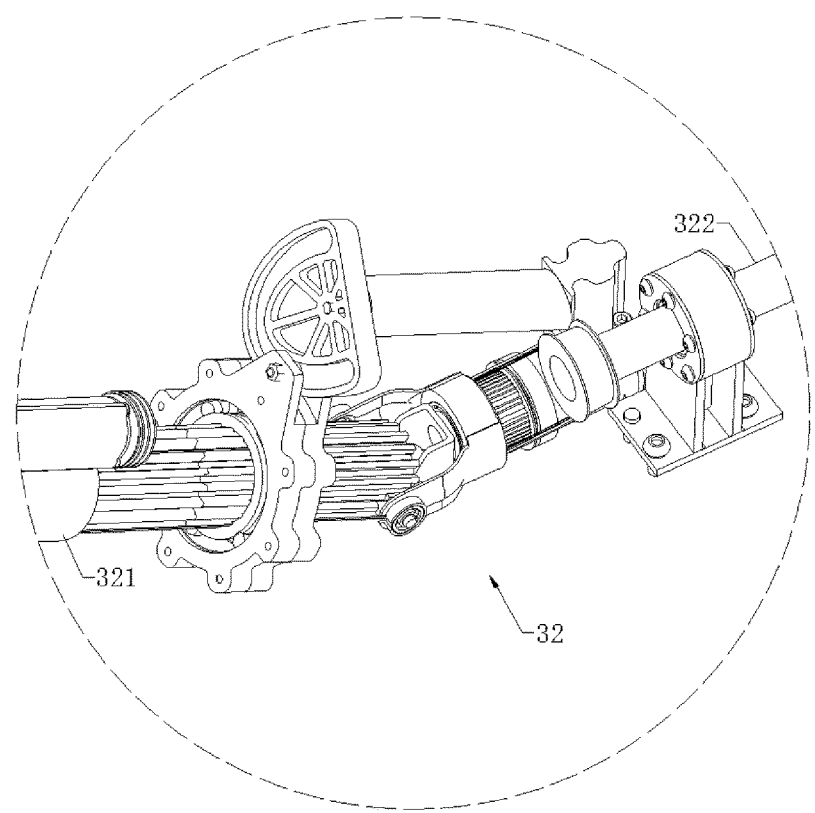
FIG. 11 is a partially enlarged view of the part I of FIG. 9.
Figure 13:
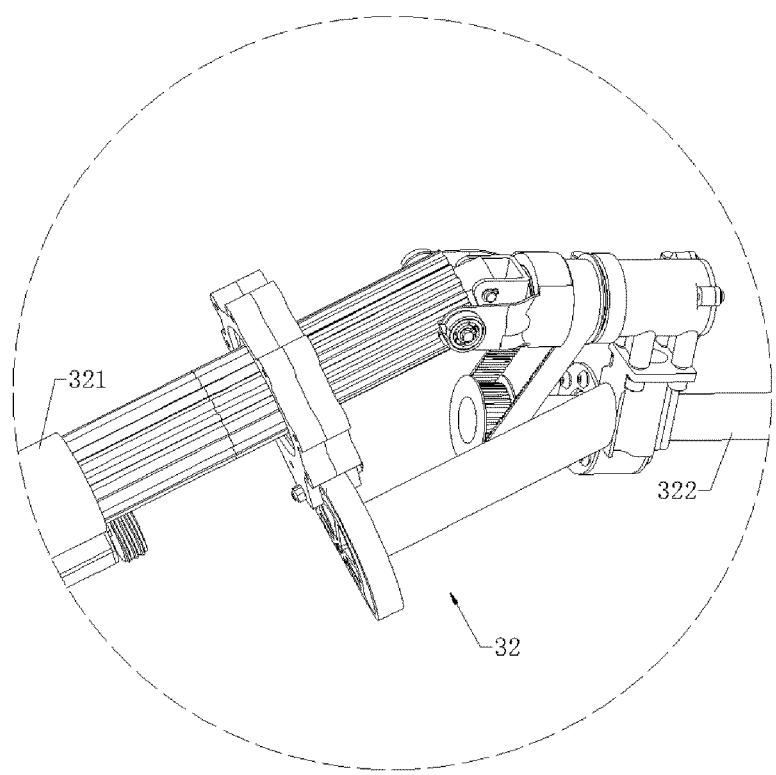
FIG. 13 is a partially enlarged view of the part III of FIG. 10.

Referring to FIG. 11 and FIG. 13, the steering transmission device 32 includes an upper transmission shaft 321 and a lower transmission shaft 322, an upper end of the upper transmission shaft 321 is connected to the steering wheel 31, a lower end of the upper transmission shaft 321 is connected to an upper end of the lower transmission shaft 322, and a lower end of the lower transmission shaft 322 fits and is connected to the synchronous belt 343. Particularly, the steering transmission device 32 of the present invention can also be designed according to steering transmission devices of existing vehicles, as long as the transmission of the rotation angle of the steering wheel can be achieved.

In particular, the lower end of the lower transmission shaft 322 is provided with transmission teeth, and the synchronous belt 343 is provided thereon with wave teeth meshing with the transmission teeth.

Furthermore, the steering wheel 31 is provided thereon with a control device configured to control the left front steering damping motor 131 and the right front steering damping motor 133. Besides directly controlled by left rotating wheel 331 and the right rotating wheel 332, the left front steering damping motor 131 and the right front steering damping motor 133 are also indirectly controlled by the control device, such that the steering of the vehicle is more accurate.

Referring to FIG. 9, the steering wheel 31 is provided thereon with a control device 311 configured for global control. The control device 311 includes at least one button 3111 and a display 3112. Wherein, the control device can have more specific structural design and control program design according to requirements, and is not limited to the mode shown in the drawings. Therefore, the control device is not described repeatedly in this embodiment.

As shown in FIG. 1, FIG. 2, and FIG. 15-FIG. 20, the vehicle body includes a passenger compartment 101 and car doors 9 arranged on the chassis 1, the passenger compartment 101 includes a front portion and a rear portion, wherein, the car doors 9 include a front cabin door 901 and a rear cabin door 902 configured to open and close the passenger compartment 101, the front cabin door 901 covers above the front portion of the passenger compartment 101, and the rear cabin door 902 covers above the rear portion of the passenger compartment 101. A front end of the front cabin door 901 is connected to the chassis 1 by a first hinge assembly 903, and a rear end of the rear cabin door 902 is connected to the chassis 1 by a second hinge assembly 904. The electric vehicle further includes a first turning mechanism 905 configured to control the front cabin door 901 to turn outwards around the first hinge assembly 903 and a second turning mechanism 906 configured to control the rear cabin door 902 to turn outwards around the second hinge assembly 904.

Under the drive of the first turning mechanism 905, the front cabin door 901 turns around the first hinge assembly 903 to open and close a front opening of the passenger compartment 101; under the drive of the second turning mechanism 905, the rear cabin door 902 turns around the second hinge assembly 904 to open and close another opening of the passenger compartment 101. In this way, the chassis 1 of the aforesaid electric vehicle does not need to be provided with an A pillar and a C pillar, and thus the problem that the visual angle of the driver is obstructed is solved, the driver can obtain a wider visual field, so that the comfort of driving is improved. Moreover, manufacturing and assembly procedures of the car doors and the chassis 1 are greatly simplified, the cost is saved, and the weight of the chassis 1 is reduced correspondingly, such that the performance of the whole vehicle is relatively improved.

In this embodiment, referring to FIG. 1 and FIG. 15 to FIG. 20, the first hinge assembly 903 includes a first hinge seat 9031 arranged at a front end of the chassis 1 and a first hinge member 9032 of which an end is arranged in and rotatable relative to the first hinge seat 9031. The first hinge seat 9031 includes a fixing slot 9033 arranged horizontally on the chassis 1, and the fixing slot 9033 is parallel to a width direction of the chassis 1; the first hinge member 9032 is a bent board, and the end thereof hinged with the first hinge seat 9031 has a circular section matching with the fixing slot 9033; another end of the first hinge member 9032 extends out of a slot opening of the fixing groove 9033 and is then fixed on the front cabin door 901, and the swing of the first hinge member 9032 is limited by an opening angle of the slot opening. The second hinge assembly 904 includes a second hinge seat arranged at a rear end of the chassis 1 and a second hinge member of which an end is arranged in and rotatable relative to the second hinge seat. The shapes and fitting methods of the second hinge seat and the second hinge member are respectively similar to that of the first hinge seat 9031 and the first hinge member 9032, and the other end of the second hinge member is fixed on the rear cabin door 902.

Figure 15:
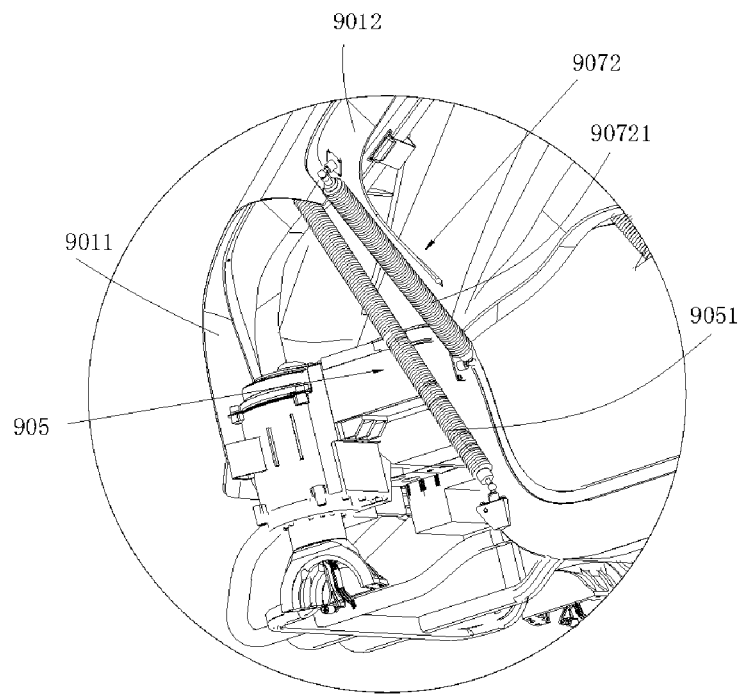
FIG. 15 is an enlarged view of the part A of FIG. 1.
Figure 16:
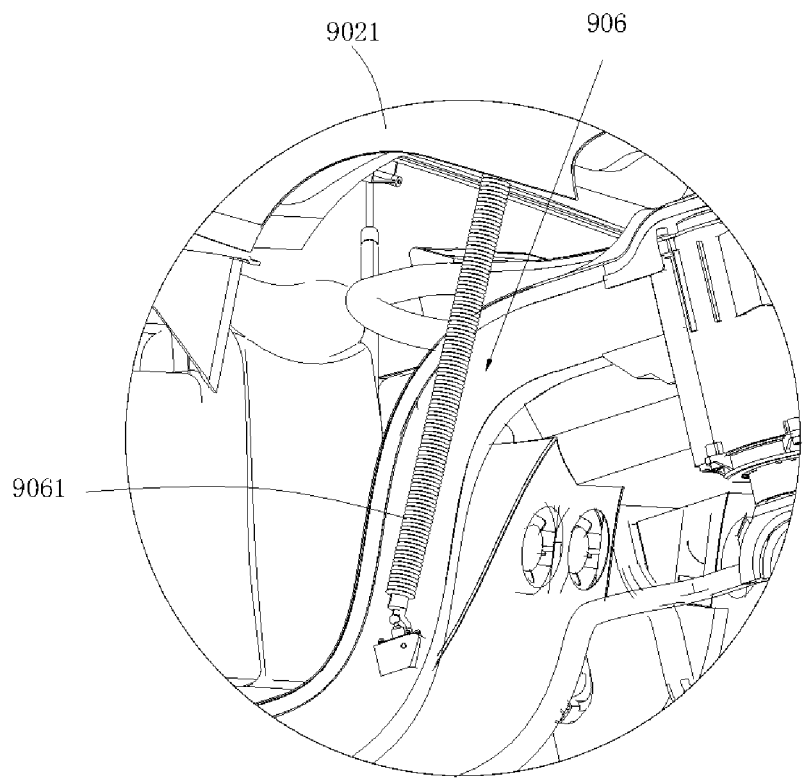
FIG. 16 is an enlarged view of the part B of FIG. 1.
Figure 17:
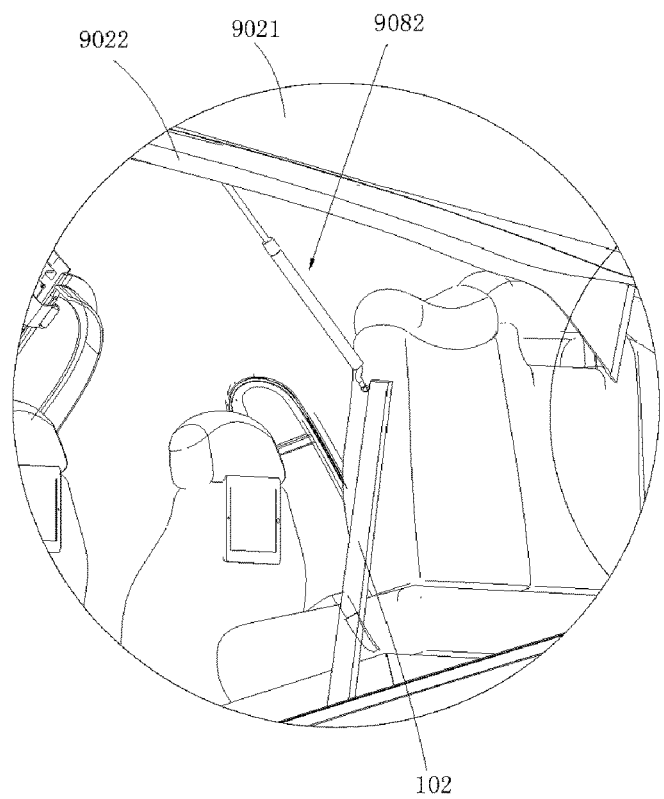
FIG. 17 is an enlarged view of the part C of FIG. 1.
Figure 18:
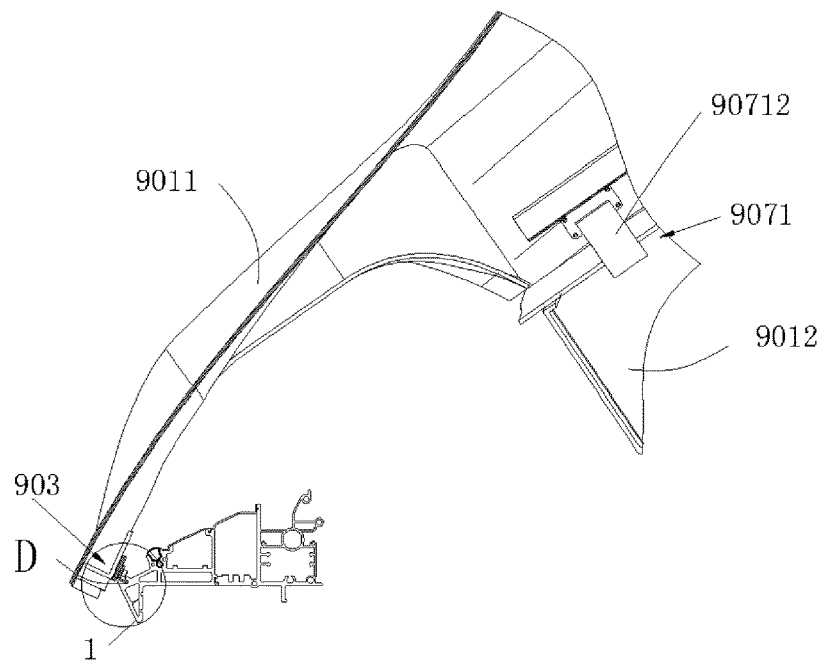
FIG. 18 is a partial cut-away view of a connecting portion between a front cabin door and a vehicle body of a vehicle provided by an embodiment of the present invention.
Figure 19:
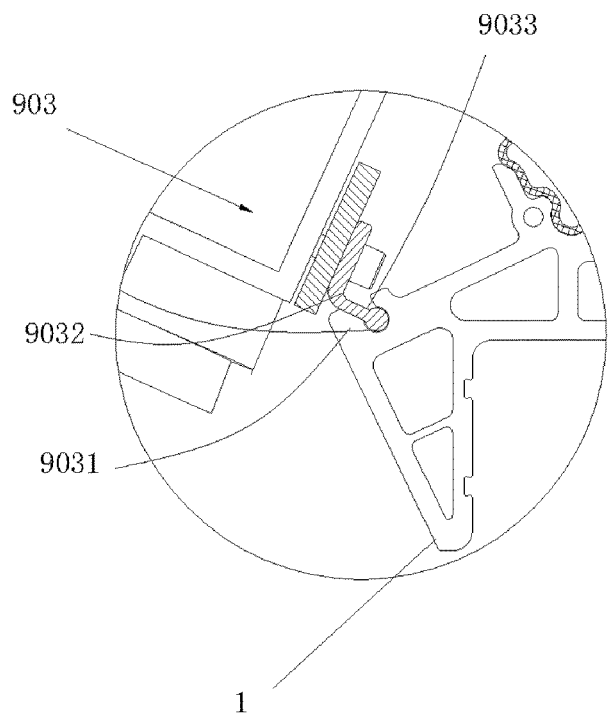
FIG. 19 is an enlarged view of the part D of FIG. 18.

Referring to FIG. 11 and FIG. 15, the first turning mechanism 905 includes a pair of first pneumatic springs 9051 arranged on the chassis 1 and located at two opposite sides of the front portion of the passenger compartment 101 respectively and at least one first air pump arranged in the chassis 1 and configured to inject high-pressure air into the first pneumatic springs 9051 so as to enable the first pneumatic springs 9051 to drive the front cabin door 901 to turn, and two ends of each first pneumatic spring are respectively connected to the front cabin door 901 and the chassis 1 by gimbals. Referring to FIG. 1 and FIG. 16, the second turning mechanism 906 includes a pair of second pneumatic springs 9061 arranged on the chassis 1 and located at two opposite sides of the rear portion of the passenger compartment 101 respectively and at least one second air pump arranged in the chassis 1 and configured to inject high-pressure air into the second pneumatic springs 9061 so as to enable the second pneumatic springs 9061 to drive the rear cabin door 902 to turn, and two ends of each second pneumatic spring are respectively connected to the rear cabin door 902 and the chassis 1 by gimbals.

In order to help passengers to enter and exit the vehicle, it can be seen from FIG. 1 that the front cabin door 901 includes a first cover 9011 and two first side doors 9012 connected to two sides of the front cover 9011 respectively, and the rear cabin door 902 includes a rear cover 9021 and two rear side doors 9022 connected to two sides of the rear cover 9021 respectively. Each of the front cover 9011 and the rear cover 9021 has a shape of a cambered surface, and a front side of the front cover 9011 has a use of serving as a windshield. The vehicle further includes a first linkage turning device 907 turning the front side doors 9012 through a linkage upon turning the front cabin door 901 and a second linkage turning device 908 turning the rear side doors 9022 through a linkage upon turning the rear cabin door 902. In this way, when the front cabin door 901 and the rear cabin door 902 are opened, the front side doors 9012 and the rear side doors 9022 simultaneously rotate outwards and form a crane-typed flat status, which enlarges the entering and exiting space at two sides of the vehicle.

In this embodiment, the first linkage turning device 907 includes a third hinge assembly 9071 connected between the front side doors 9012 and the front cover 9011 and a third turning mechanism 9072 connected between the front side doors 9012 and the chassis 1 and driving the front side doors 9012 to turn around the third hinge assembly 9071 respectively when the front cabin door 901 turns; the second linkage turning device 908 includes a fourth hinge assembly 9081 connected between the rear side doors 9022 and the rear cover 9021 and a fourth turning mechanism 9082 connected between the rear side doors 9022 and the chassis 1 and driving the rear side doors 9022 to turn around the fourth hinge assembly 9081 respectively when the rear cabin door 902 turns.

Figure 20:
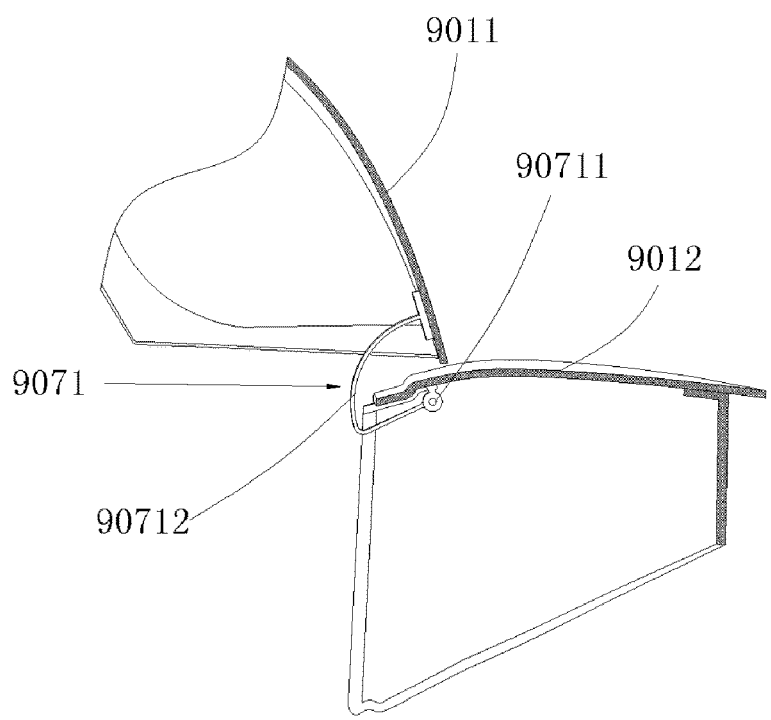
FIG. 20 is a partial cut-away view of a connecting portion between a front cover and a front side door of an electric vehicle provided by an embodiment of the present invention.

Referring to FIG. 1 and FIG. 20, the third hinge assembly 9071 includes a first fixing shaft 90711 arranged at two sides of the front cover 9011 and a third hinge member 90712 of which one end is sheathed on and rotatable relative to the first fixing shaft 90711, another end of the third hinge member 90712 is fixed on the front side door 9012, and the third hinge member 90712 includes a planar part hinged with the first fixing shaft 90711 and a curved part connected with the front side door 9012; the fourth hinge assembly 9081 includes a second fixing shaft 90811 arranged at two sides of the rear cover 9021 and a fourth hinge member 90812 of which one end is sheathed on and rotatable relative to the second fixing shaft 90811, another end of the fourth hinge member 90812 is fixed on the rear side door 9022, and connecting methods and shapes of the second fixing shaft 90811 and the fourth hinge member 90812 are respectively similar to that of the first fixing shaft 90711 and the third hinge member 90712.

The third turning mechanism 9072 includes a pair of third pneumatic springs 90721. It can be seen from FIG. 1, FIG. 15, and FIG. 17 that each third pneumatic spring 90721 has a first end connected to the chassis 1 by a gimbal and a second end connected to the first side door 9021; when the first cabin door 901 is closed, the first end is located above the second end. When the first cabin door 901 is opened, the third pneumatic springs 90721 are rotated, and there is a certain included angle between a rotation plane of each third pneumatic spring 90721 and a rotation plane of the first pneumatic spring 9051. When the first cabin door 901 is opened, the first end is located under the second end. The fourth turning mechanism 9082 includes a pair of fourth pneumatic springs 90821, two sides of the chassis 1 are respectively provided with two fixing pillars 102 arranged longitudinally (i.e., the B-pillars), and each fourth pneumatic springs 90821 is connected to one of the rear side doors 9022 and a top end of one of the fixing pillars 102 by gimbals, and the structure of the fourth turning mechanism 9082 is similar to that of the third turning mechanism 9072.

The aforesaid front cabin door 901 and rear cabin door 902 can synchronously or asynchronously turn forwards and backwards, that is, turn in a spreading manner. The front side doors 9012 and the rear side doors 9022 can also synchronously or asynchronously turn laterally, that is, turn in a "crane wing" manner. In order to limit the turning extent and thereby prevent too large turning from causing damages, each of the first pneumatic springs 9051, the second pneumatic springs 9061, the third pneumatic springs 90721, and the fourth pneumatic springs 90821 can be provided with a stroke limiting block.

The front cabin door 901 and/or the rear cabin door 902 is/are provided with solar panels, and thus can recharge the power battery.

Figure 21:
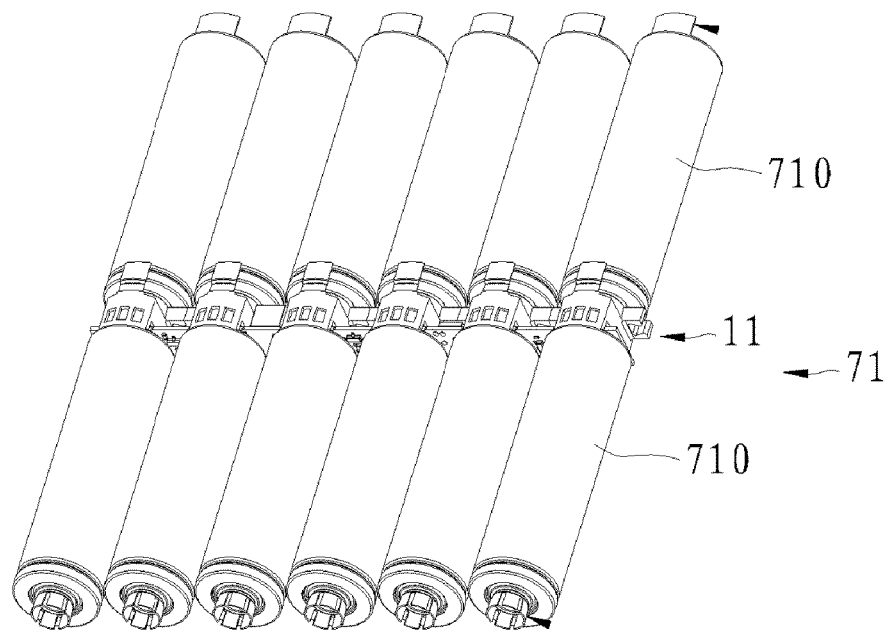
FIG. 21 is a schematic view of a power battery provided by an embodiment of the present invention.

Referring to FIG. 21, the power battery 71 includes a plurality of cells 710 and a cell state collecting device 11. The power battery uses the cell state collecting device 11, so that the use of connecting wires is correspondingly reduced and shortened, the arrangement space is saved, and thus the heat dissipation space of the cells can increase and the heat dissipation efficiency can be improved. Moreover, more cells can be arranged in the same volume, such that the electric energy capacity of the power battery is increased. The cells and the cell state collecting device 11 can adopt structures known in the art, and are not described in detail here.

Referring to FIG. 22-FIG. 28, an example of a vehicle battery clamping device provided by an embodiment of the present invention is shown. The vehicle battery clamping device is mounted on a frame system of an electric vehicle (the drawings do not show the frame system) to clamp two identical power batteries 71 of the electric vehicle, and includes: a fixing beam 72 fixedly arranged on the frame; a handle shaft 73 rotatably arranged on the fixing beam 72, wherein the handle shaft 73 is fixedly provided thereon with a winding pulley set 731 (as shown in detail in FIG. 25 and FIG. 26); a wirerope 732 winding on the winding pulley set 731; a front shaft 741 of which an upper end is rotatably connected to the fixing beam 72 and a lower end is provided with a front snap board 742, wherein the front snap card 742 is perpendicular to the front shaft 741; a rear shaft 743 of which an upper end is rotatably connected to the frame system and a lower end is provided with a rear snap board 744, wherein the rear snap board 744 is perpendicular to the rear shaft 743; a synchronous belt 75 configured to synchronously drive the front shaft 741 and the rear shaft 743 to rotate, of which two ends are respectively coiled on the front shaft 741 and the rear shaft 743; a guide pulley assembly 76 configured to change the transmission direction of the wirerope 732, wherein the guide pulley assembly 76 is arranged on the fixing beam 72, the wirerope 732 runs through the guide pulley assembly 76, and two ends of the wirerope 732 are respectively connected to the synchronous belt 75. The fixing beam 72, the front shaft 741, and the front snap board 742 cooperatively form an H-shaped clamping structure, and the rear snap board 744 and the rear shaft 743 cooperatively form an inverted T-shaped clamping structure. Front and rear ends of the two power batteries 71 are respectively clamped at two sides of the H-shaped clamping structure and at two sides of the inverted T-shaped clamping structure.

Assuming that the drawings show the original state of the embodiment of the present invention, when the handle shaft 73 is rotated, the winding pulley set 731 drives the wirerope 732 to rotate; the wirerope 732 utilizes the guidance/steering of the guide pulley assembly 76 to drive the synchronous belt 75 to rotate, the synchronous belt 75 drives the first shaft 741 and the rear shaft 743 to rotate simultaneously, and thus the front snap board 742 and the rear snap board 744 rotate along with the first shaft 741 and the rear shaft 743. When both the front snap board 742 and the rear snap board 744 rotate by 90 degrees, they are aligned with the clearance between the two power batteries 71, at this time, the power batteries 71 can be detached. If the power batteries 71 needs to be mounted again, as long as the power batteries 71 are positioned at clamping locations, and the handle shaft 73 is rotated, such that the front snap board 742 and the rear snap board 744 are rotated so as to form included angles of 90 degrees with the power batteries 71, fixing and clamping for the power batteries 71 are completed.

The present invention, by adopting the transmission of the wirerope and the guidance effect of the guidance pulley assembly, indirectly drives the rotations of the front snap board and the rear snap board cleverly, such that the effects of clamping and releasing the batteries are achieved. The present invention has a simple structure and a low weight, not only does the present invention save the cost and save the assembly space, but also the present invention is convenient to be operated; the batteries can be mounted and detached quickly and easily, and mounting and detachment of the batteries can be achieved without the aid of other tools.

In combination with FIG. 5, in order to facilitate the rotating operation to the handle shaft 73, two ends of the handle shaft 73 are respectively provided with handles 732 that are foldable and retractable, and each handle 732 is perpendicular to the handle shaft 73. When the present invention is not operated, the handles 732 are folded and retract; when the present invention is operated, the handles 732 are unfolded and rotate around the axis of the hand shaft 73.

Figure 25:
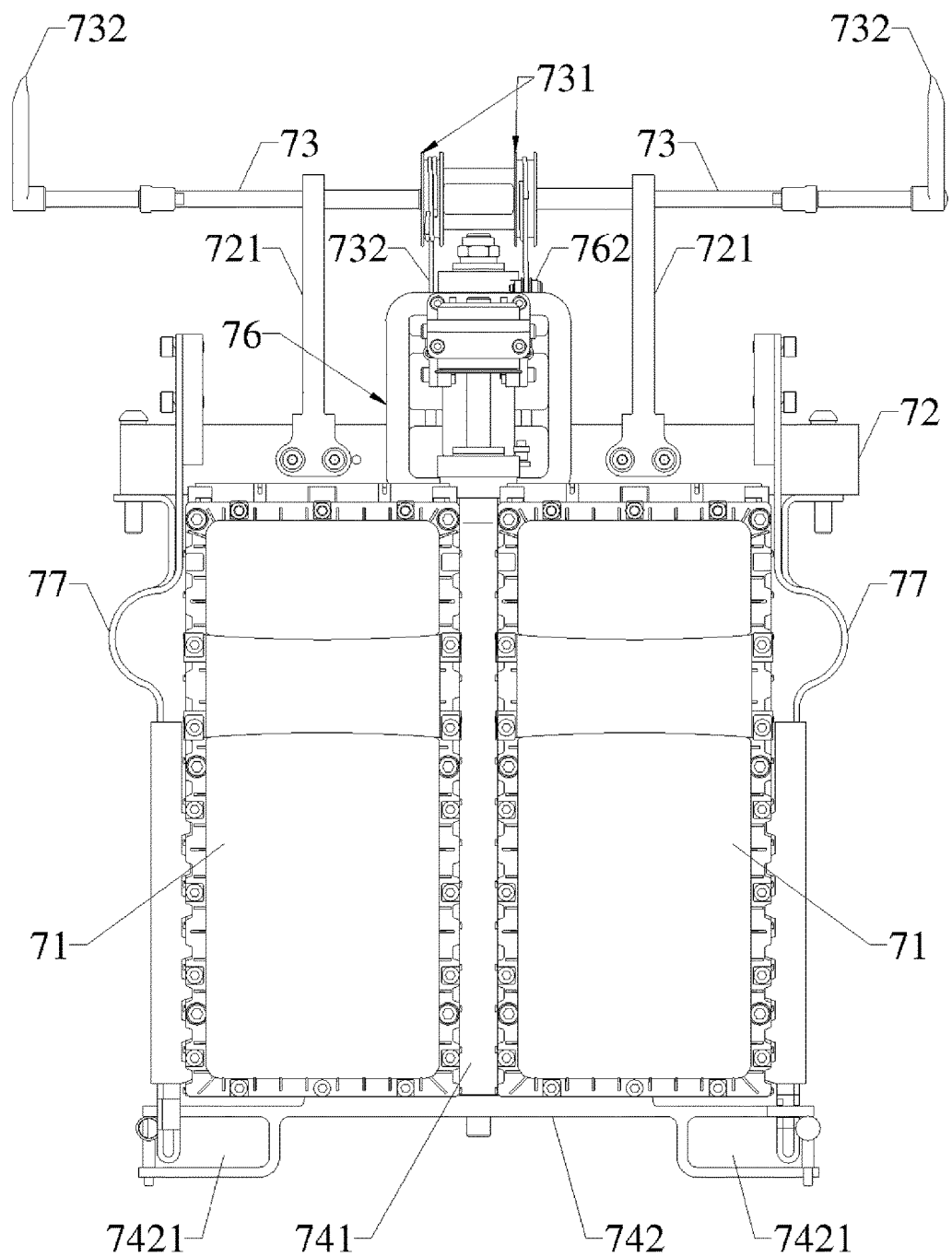
FIG. 25 is a front view of a front end surface of the battery clamping device of the electric vehicle of FIG. 1.

Particularly, referring to FIG. 25, the fixing beam 72 is provided thereon with a supporting frame 721 configured to support the handle shaft 73, and the handle shaft 73 is rotatably arranged on the supporting frame 721.

Figure 26:
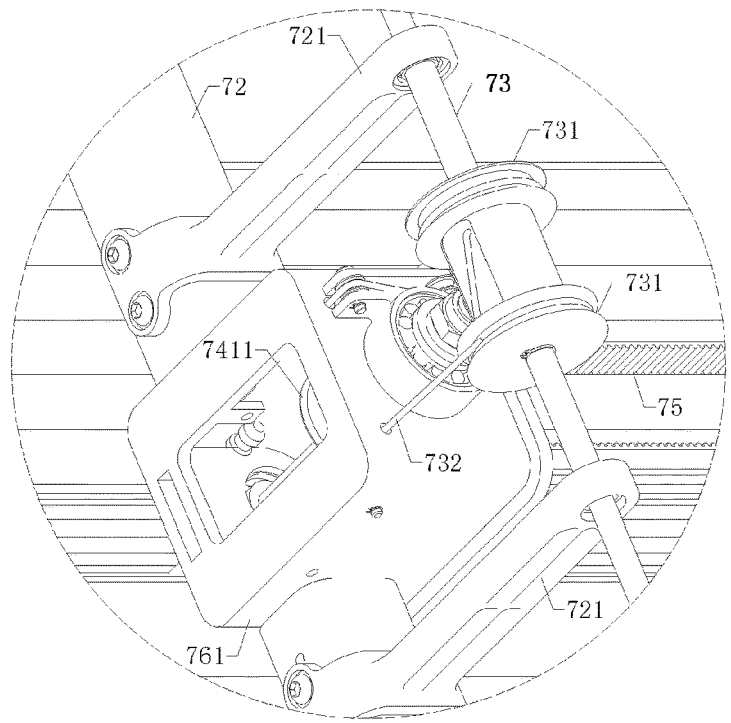
FIG. 26 is a partially enlarged view of the part I of FIG. 22.
Figure 27:
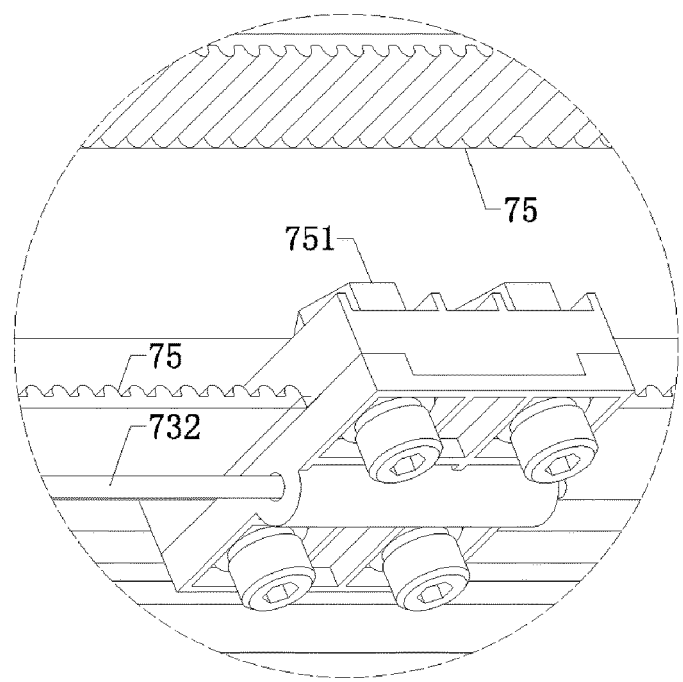
FIG. 27 is a partially enlarged view of the part II of FIG. 22.

Referring to FIG. 25 and FIG. 26, the guide pulley assembly 76 includes a frame 761 and a plurality of guide pulleys 762 configured to change the transmission direction of the wirerope 732, the frame 761 is arranged on the fixing beam 72, the guide pulleys 762 are arranged in the frame 761, and the wirerope 732 which runs through the guide pulley assembly 76 is coiled on the guide pulleys 762. In particular, the structure shown in FIG. 26 is one embodiment of the present invention. The guide pulleys 762 in the frame 761 can be arranged according to the requirement of the actual structure, as long as the transmission direction of the wirerope 732 can be changed, for example, it is possible to adopt only two pulleys to change the transmission direction of the wirerope 732 vertically.

Particularly, a front gear 7411 is sheathed on the front shaft 741, and a rear gear 7431 is sheathed on the rear shaft 743. The synchronous belt 75 is a flexible rack, the flexible rack is a closed loop and winds on the front gear 7411 and the rear gear 7421. Using the flexible rack as the synchronous belt can achieve a flexible reciprocating movement effect. The flexible rack drives the rotations of the front shaft 741 and the rear shaft 743.

Figure 22:
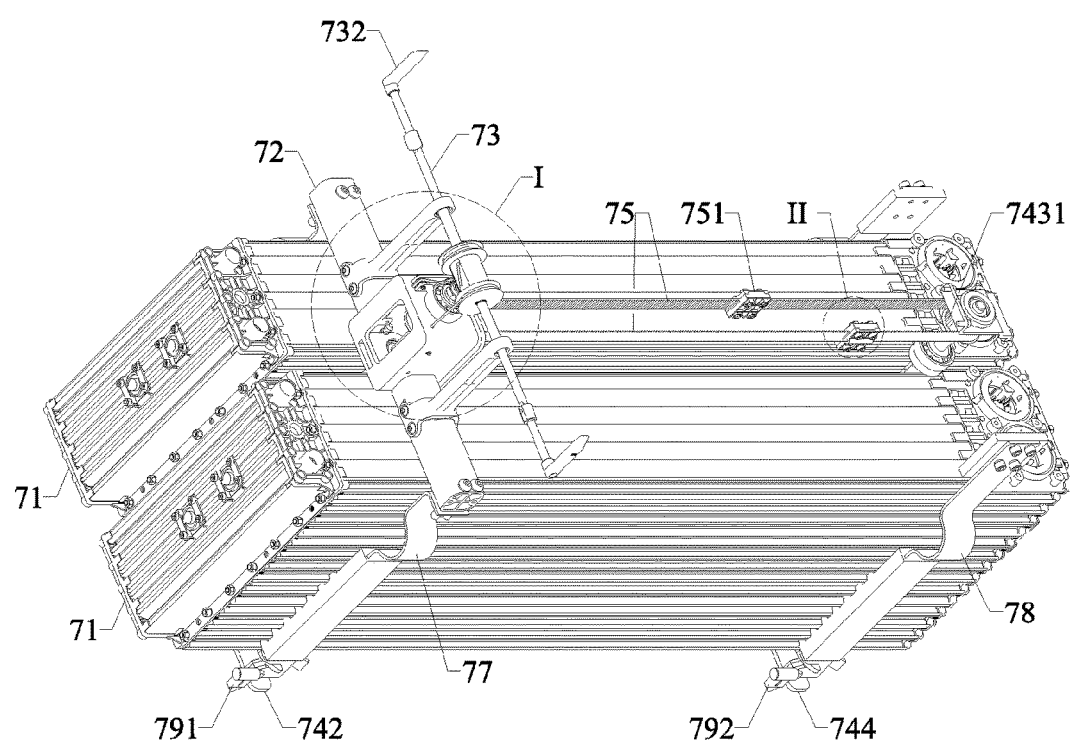
FIG. 22 is a top perspective view of a battery clamping device of the electric vehicle of FIG. 1.
Figure 23:
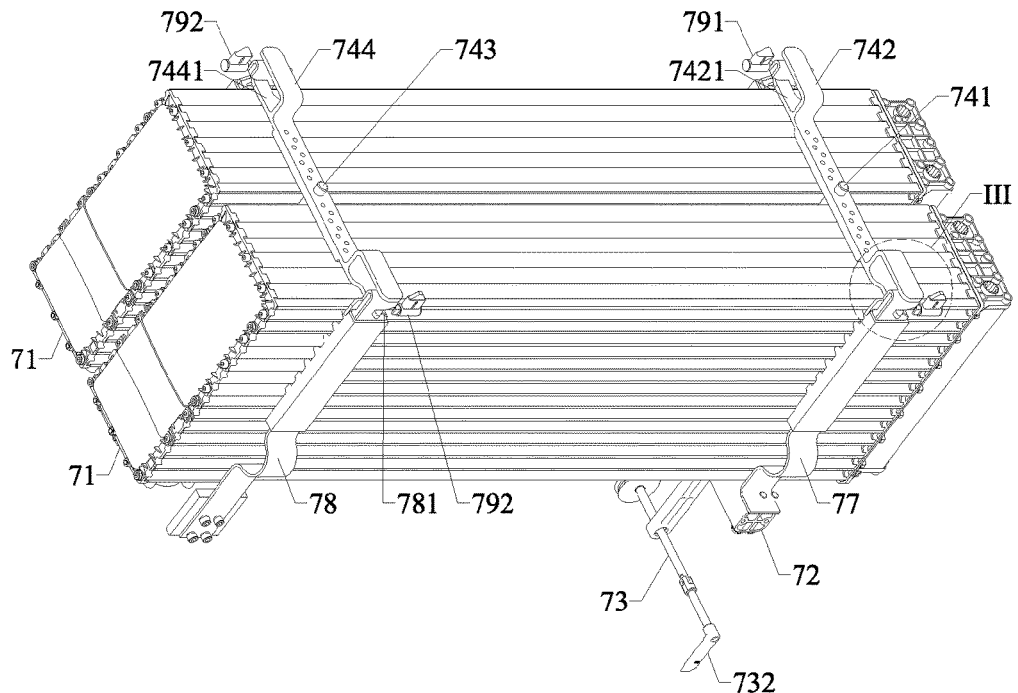
FIG. 23 is a bottom perspective view of the battery clamping device of the electric vehicle of FIG. 1.
Figure 24:
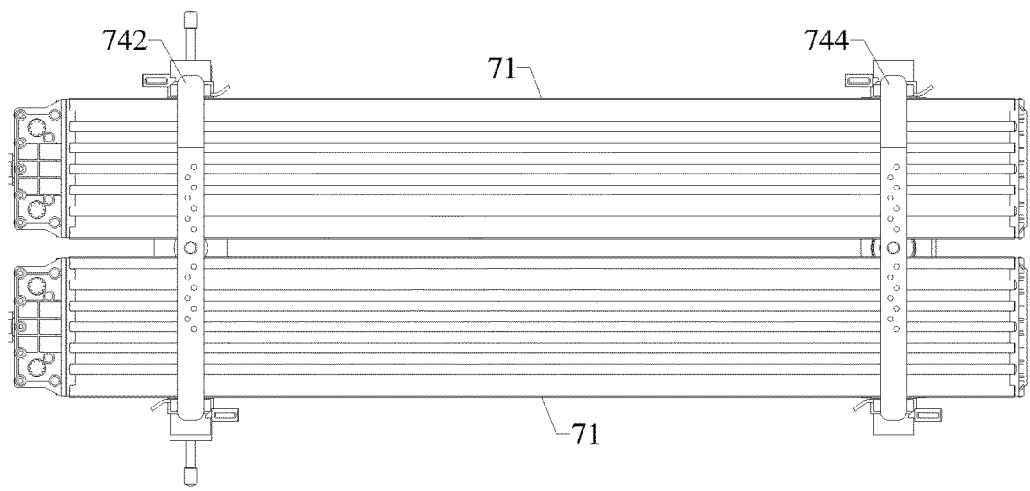
FIG. 24 is a view of a bottom part of the battery clamping device of the electric vehicle of FIG. 1.

Referring to FIG. 22 to FIG. 24, two ends of the fixing beam 72 are respectively provided with front clamping pieces 77 with elasticity, and the front clamping pieces clamps outer sides of the power batteries 71; the frame system is provided thereon with two rear clamping pieces 78 with elasticity, and the rear clamping pieces 78 clamps outer sides of the power batteries 71 too. The front clamping pieces 77 and the rear clamping pieces 78 provide positioning and damping effects for the power batteries 71. The front clamping pieces 77 and the rear clamping pieces 78 has elasticity, which facilitates mounting of the power batteries 71. Each of the front clamping pieces 77 and the rear clamping pieces 78 can also be provided thereon with damping polyurethane material, which is configured for damping and anti-skidding.

Figure 28:
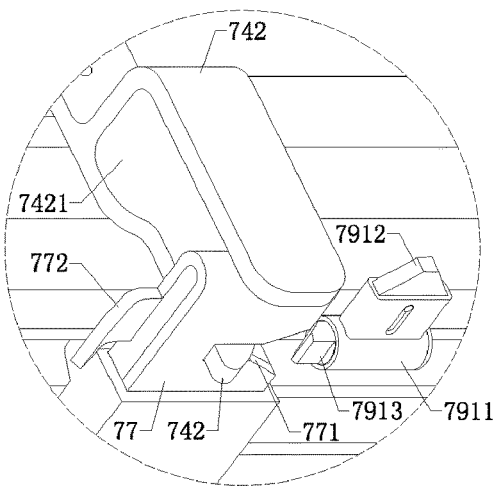
FIG. 28 is a partially enlarged view of the part III of FIG. 22.
Figure 29:
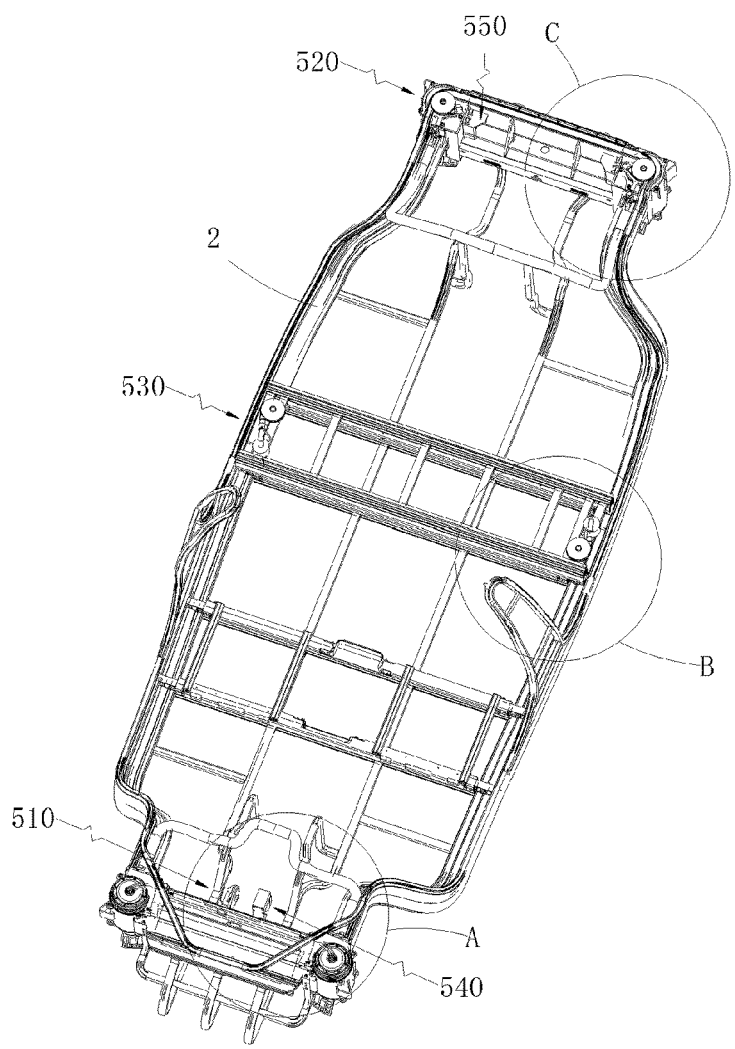
FIG. 29 is a perspective view of a vehicle air supply system applied on the frame system provided by the present invention.
Figure 30:
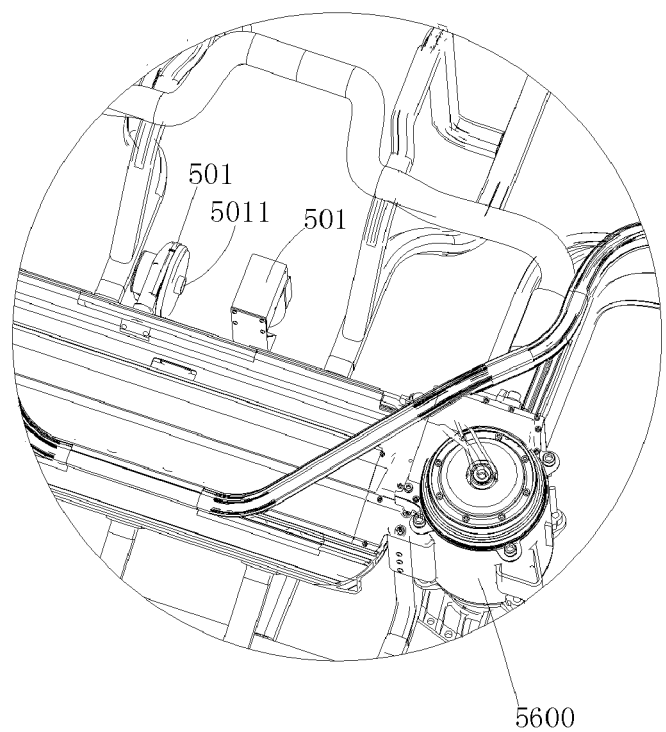
FIG. 30 is an enlarged view of the part A of FIG. 29.
Figure 31:
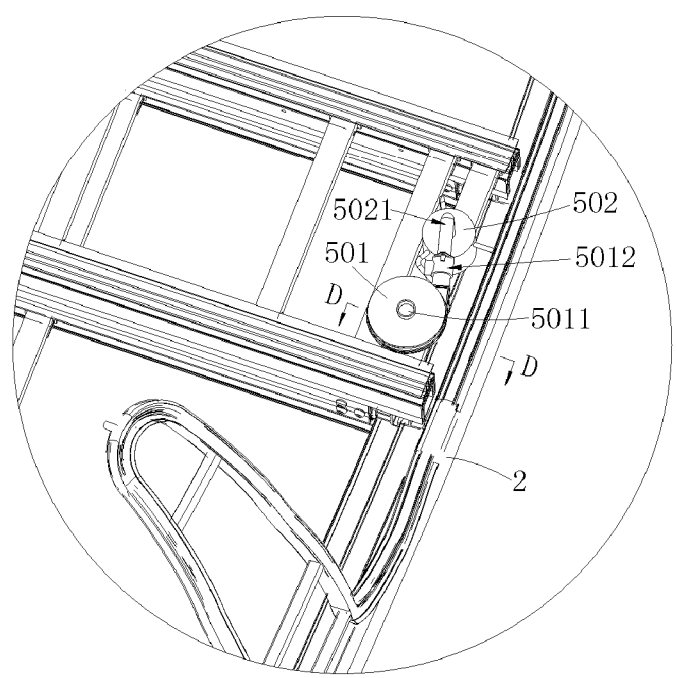
FIG. 31 is an enlarged view of the part B of FIG. 29.
Figure 32:
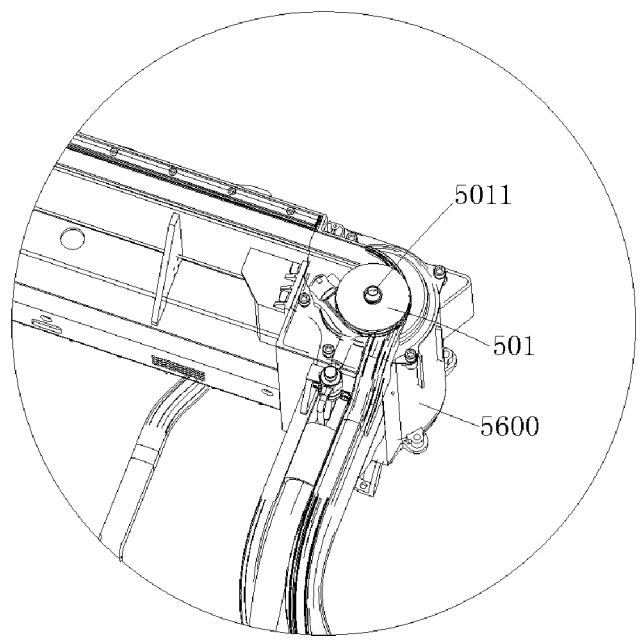
FIG. 32 is an enlarged view of the part C of FIG. 29.
Figure 33:
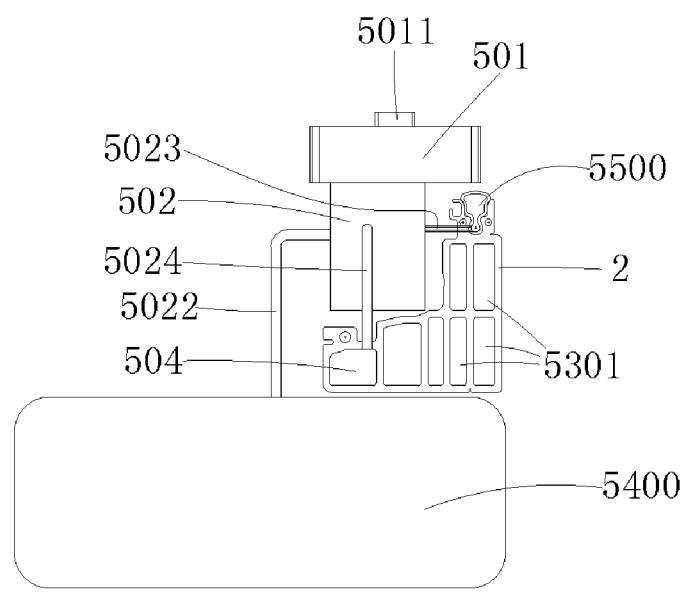
FIG. 33 is a cut-away view along the line D-D of FIG. 31.

Referring to FIG. 23 and FIG. 28, a distal end of each of the two front clamping pieces 77 is provided with a front bayonet 771 allowing the front snap board 742 to engage, and the frame system is provided thereon with a front bayonet lock member 791 that can lock the front snap board 742 in the front bayonet 771; a distal end of each of the two rear clamping pieces 78 is provided with a rear bayonet 781 allowing the rear snap board 744 to engage, and the frame system is provided thereon with a rear bayonet lock member 792 that can lock the rear snap board 744 in the rear bayonet 781. In this way, there can be stable closing between the front snap board 742 and the front clamping piece 77 and between the rear snap board 744 and the rear clamping piece 78, thereby preventing the power batteries 71 from getting loose.

Still referring to FIG. 28, the front bayonet lock member 791 includes a front lock sleeve 7911, a front pressing block 7912, and a front lock block 7913 that can retract into the front lock sleeve 7911 upon being pressed by the front pressing block 7912, and both the front pressing block 7912 and the front lock block 7913 are arranged in the front lock sleeve 7911; in combination with FIG. 23, the rear bayonet lock member 792 includes a rear lock sleeve, a rear pressing block, and a rear lock block that can retract into the rear lock sleeve upon being pressed by the rear pressing block, and both the rear pressing block and the rear lock block are arranged in the rear lock sleeve. In this embodiment of the present invention, the structure of the rear bayonet lock member 792 is similar to that of the front bayonet lock member 791, the details can be seen from FIG. 28. When the front snap board 742 rotates, it presses the front pressing block 7912, such that the front lock block 7913 retracts into the front lock sleeve 7911. In this way, the front snap board 742 can be separated from the front clamping pieces 77, and the power batteries 71 are detached.

Particularly, two ends of the front snap board 742 are respectively provided with front U-shaped gaps 7421 engaging with the front bayonets 771, and two ends of the rear snap board 744 are respectively provided with rear U-shaped gaps 7441 engaging with the rear bayonets 781. By arranging the U-shaped gaps at two ends of each snap board, engagements and separations between the front snap board 742 and the front clamping piece 77 and between the rear snap board 744 and the rear clamping piece 78 can be realized better. Furthermore, in order that two ends of each snap board can be inserted into the bayonets more easily, each clamping piece is provided thereon with an incline piece, and the incline piece is located behind the bayonet; as shown in FIG. 28, a front incline piece 772 is arranged behind the front bayonet 771. When a snap board impacts an incline piece behind a bayonet, a clamping piece opens outwards, such that two ends of the snap board can be respectively inserted into two bayonets.

Particularly, the front snap board 742, the front clamping pieces 77, the rear snap board 744, and the rear clamping piece 78 in this embodiment of the present invention have similar structure forms.

Hereinafter, with reference to the specific structure of the vehicle battery clamping device provided by the aforesaid embodiment, operation steps of the vehicle battery clamping device are described briefly.

First, a retractable bearing tool (e.g., a floor jack) is placed under the power batteries 71 and used to bear the power batteries 71.

Thus, the handle shaft 73 is rotated, such that the wirerope 732 drives the synchronous belt 75 to transmit; the synchronous belt 75 drives the front shaft 741 and the rear shaft 743 to rotate, such that the front snap board 742 and the rear snap board 744 are aligned with the clearance between the two power batteries 71, and then the power batteries 71 fall; the power batteries 71 fall onto the retractable bearing tool, and the bearing tool retracts, such that the power batteries 71 are separated from the vehicle battery clamping device, and the detachment of the power batteries 71 is realized.

Figure 34:
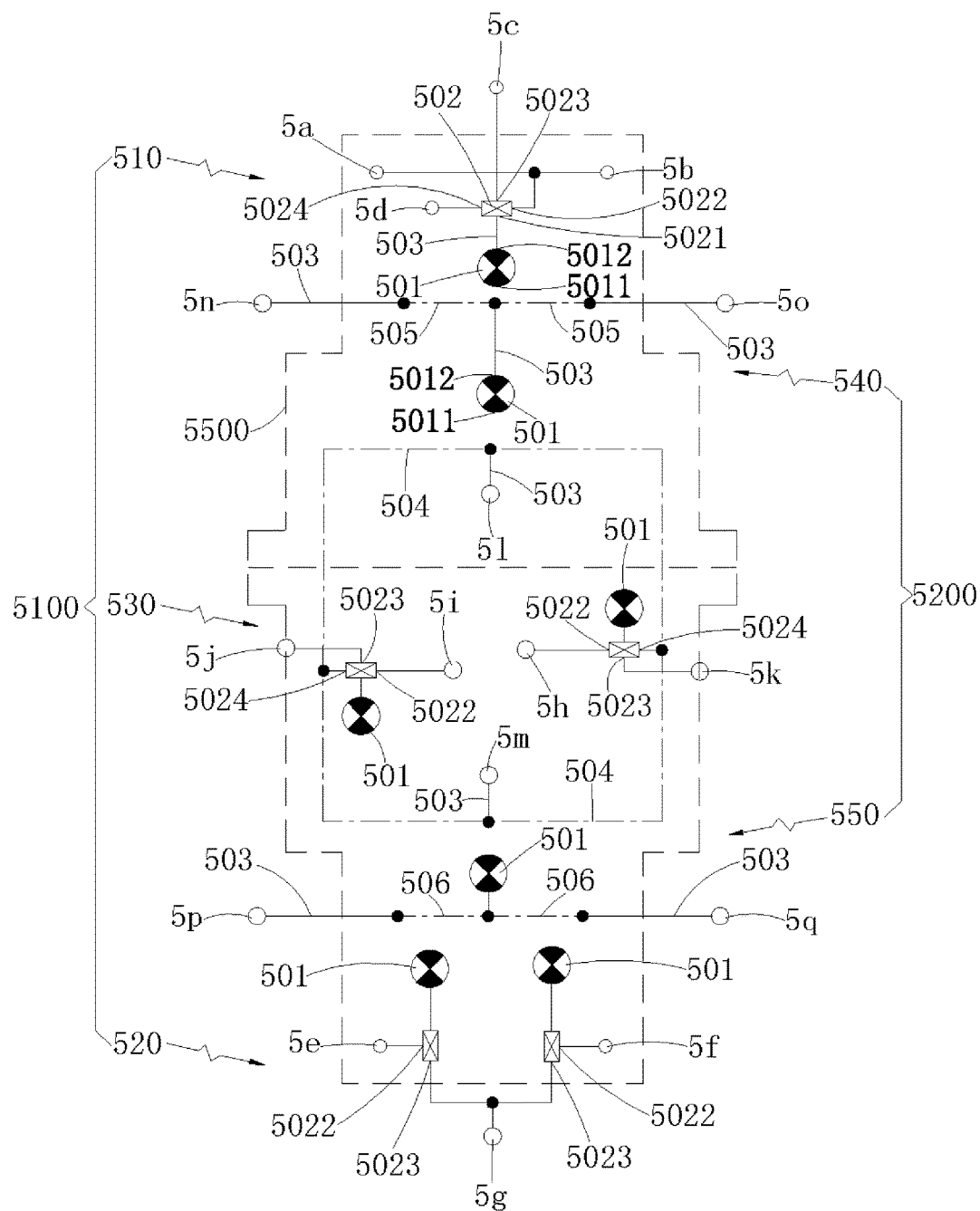
FIG. 34 is a schematic view of a vehicle air supply system provided by an embodiment of the present invention.

The electric vehicle provided by this embodiment of the present invention further comprises a vehicle air supply system. Please referring to FIG. 29 to FIG. 34, the vehicle air supply system is mounted on the frame system 2 and configured to provide a plurality of air supply openings. In FIG. 34, conduits 503 are represented by solid lines, airbag-type sealing strips 5500 are represented by dashed lines, a first vent pipe 504, a second vent pipe 505, and a third vent pipe 506 are represented by dotted lines, nodes are represented by solid circles, and the air supply openings are represented by hollow circles.

The vehicle air supply system includes an air source device 501 having an air inlet 5011 and an air outlet 5012, a control valve 502 having one input end 5021 and a plurality of output ends (5022, 5023, 5024) and configured to switch directions of air flows, a controller (not shown in the drawings) sending electric signals to the control valve 502 or the air source device 501 to switch working states, and a plurality of conduits 503 each having a start end and a terminating end. The controller adopts a vehicle control computer system to control various electronic components in the electric vehicle. The start end of each conduit 503 is an inlet through which fluid enters the conduit 503, and the terminating end of each conduit 503 is an outlet through which fluid is discharged from the conduit 503.

The air source device 501, the control valve 502, and the conduits 503 form a first type of air supply system 5100, wherein the air outlet 5012 of the air source device 501 is connected to the input end 5021 of the control valve 502 by one of the conduits 503, the start ends of the plurality of conduits are respectively connected with the plurality of output ends (5022, 5023, 5024) of the control valve 502, and the terminating ends of the plurality of conduits form the air supply opening. In the first type of air supply system 5100, the controller is electrically connected with the control valve 502, and the controller can switch the directions of air flows passing through the control valve 502 and thus realize the on-off control of every output end of the control valve 502. When the air source device 501 works, air enters from the air inlet 5011 of the air supply device 501 and is exhausted from the air outlet 5012 of the air supply device 501; air passes through the control valve 502, the control valve 502 works under electric signals of the controller, the terminating ends of the conduits connected with the output ends of the control valve 502 form a plurality of air supply openings, and the exhaust of the air supply openings is controllable. The plurality of air supply openings provided by the first type of air supply system 5100 work independently from each other.

The air source device 501 and the conduits 503 form a second type of air supply system 5200, wherein the start end of one of the conduits 503 is connected with the air outlet 5012 of the air source device 501 and the terminating end of the conduit 503 forms a node, this node is connected in series with a plurality of conduits 503 respectively, and the terminating ends of the plurality of conduits 502 form the air supply opening. The node means an intersecting point formed by an intersection of a plurality of conduits or other components that can form a fluid passage. In the second type of air supply system 5200, the controller is electrically connected with the air source device 501, and the controller can realize an on-off control for the air source device 501. When the controller sends an "on" electric signal to the air source device 501, the air source device 501 works, air enters from the air inlet 5011 of the air source device 501 and is exhausted from the air outlet 5012 of the air source device 501, and the terminating ends of the conduits connected with the air outlet 5012 of the air source device 501 form a plurality of air supply openings. On the contrary, when the controller sends an "off" electric signal to the air source device 501, the air source device 501 does not work, and the terminating ends of the conduits will not supply air. The plurality of air supply openings provided by the second type of air supply system 5200 work simultaneously.

It is an optimal arrangement scheme that the first type of air supply system 5100 and the second type of air supply system 5200 are properly arranged on the electric vehicle and both the first type of air supply system 5100 and the second type of air supply system 5200 are centralizedly controlled by one controller. Not only are controllable air supply requirements of various positions met, but also the effects of occupying small space and lowering power consumption are achieved.

The air resource device 501, the control valve 502, and the plurality of conduits 503 form the first type of air supply system 5100, the first type of air supply system 5100 has a plurality of air passages, each air passage provides an air supply opening respectively, and the air supply opening is arranged at a position on the electric vehicle requiring air supply; the controller can realize the switching of the working states of the control valve 502, perform on-off controls for the plurality of air passages, and thus realize controllable air supply effects for many positions. The air resource device 501 and the plurality of conduits 503 form the second type of air supply system 5200, the second type of air supply system 5200 has a plurality of air passages too, each air passage provides an air supply opening respectively, and the air supply opening is arranged at a position on the electric vehicle requiring air supply; moreover, the controller can realize the switching of the working states of the air resource device 501, perform on-off controls for the plurality of air passages, and thus realize a controllable air supply effect. Particularly, uses of wind in a pure electric vehicle include heat dissipation of motors, sealing of cabin doors, safety air cushions, pneumatic springs, and so on; properly arranging the first type of air supply system 5100 and the second type of air supply system 5200 in the electric vehicle can achieve a controllable air supply effect at many positions.

Furthermore, the first type of air supply system 5100 comprises a first air supply subsystem 510 mounted at a front part of the frame system 2, a second air supply subsystem 520 mounted at a rear part of the frame system 2, and a third air supply subsystem 530 mounted at a middle part of the frame system 2; the second type of air supply system 5200 comprises a fourth air supply subsystem 540 mounted at a front part of the frame system 2 and a fifth air supply subsystem 550 mounted at a rear part of the frame system 2; the first air supply subsystem 510, the second air supply subsystem 520, the third air supply subsystem 530, the fourth air supply system 540, and the fifth air supply system 550 are all controlled by the controller. The first air supply subsystem 510 is configured for air supply and heat dissipation for the hub motors and the steering motors arranged at two sides of the front part of the electric vehicle, air supply for front battery anti-collision air cushions, and air supply for an awning; the second air supply subsystem 520 is configured for air supply and heat dissipation for the hub motors and the steering motors arranged at two sides of the rear part of the electric vehicle, and air supply for rear battery anti-collision air cushions; the third air supply subsystem 530 is configured for air supply for sealing the front and rear cabin doors of the electric vehicle, dust removal for connectors of the power batteries, and air supply for air cushions. The fourth air supply subsystem 540 and the fifth air supply subsystem 550 are respectively configured for air supply for the pneumatic springs of the front and rear cabin doors of the electric vehicle. These air supply subsystems are all centralizedly controlled by one controller, such that the vehicle air supply system has better operability and practicability, and various air supply requirements of users of the electric vehicle are met. Arranging these air supply subsystems at different positions of the frame system 2 confirms to the principle of proximity and can reduce the occupied space.

Furthermore, the first air supply subsystem 510 includes an air source device 501, a control valve 502, and a plurality of conduits 503. The first air supply subsystem 510 has four air supply openings (5a, 5b, 5c, 5d), the output ends of the control valve 502 comprises a first output end 5022, a second output end 5023, and a third output end 5024, the first output end 5022 of the control valve 502 is communicated with two air supply openings 5a and 5b (which are configured for air supply and heat dissipation for the hub motors and the steering motors arranged at two sides of the front part of the electric vehicle) of the four air supply openings, wind coming from the first output end 5022 of the control valve 502 flows to a node along one of the conduits 503, and further respectively flows from the node to corresponding air supply openings 5a and 5b along two of the conduits 503. Axial directions of the air supply openings 5a and 5b are perpendicular to the plane where the frame system 2 is located, that is, the axial directions of the air supply openings 5a and 5b are parallel to an axial direction of a steering motor 5600, such that wind exhausted from the air supply openings is sent into the hub motors and the steering motors, and the heat dissipation for the hub motors and the steering motors arranged at two sides of the front part of the electric vehicle is realized. Moreover, the second output end 5023 and the third output end 5024 of the control valve 502 are respectively communicated with the other two air supply openings 5c and 5d (which are configured for the air supply for the front battery anti-collision air cushions and the air supply for the awning) of the four air supply openings, the second output end 5023 is connected with the start end of a conduit and the terminating end of the conduit forms the air supply opening 5c, the third output end 5024 is connected with the start end of another conduit and the terminating end of the conduit forms the air supply opening 5d.

Furthermore, the second air supply subsystem 520 includes two air source devices 501, two control valves 502, and a plurality of conduits 503. The second air supply subsystem 520 has three air supply openings (5e, 5f, 5g), the output ends of each control valve 502 include a first output end 5022 and a second output end 5023, the first output ends 5022 of the two control valves 502 are respectively communicated with two air supply openings 5e and 5f (which are configured for air supply and heat dissipation for the hub motors and the steering motors arranged at two sides of the rear part of the electric vehicle) of the three air supply openings. Wind coming from the first output end 5022 of the control valve 502 flows to the air supply openings 5e and 5f along the conduits, the axial directions of the two air supply openings are perpendicular to the plane where the frame system 2 is located, that is, the axial directions of the two air supply openings are parallel to the axial directions of the steering motors, such that wind exhausted from the air supply openings is sent into the hub motors and the steering motors, and the heat dissipation for the hub motors and the steering motors arranged at two sides of the rear part of the electric vehicle is realized. The second output ends 5023 of the two control valves 502 are communicated with each other and further communicated with the last air supply opening 5g (which is configured for air supply for the rear battery anti-collision air cushions) of the three air supply openings. Wind coming from the second output ends 5023 of the two control valve 502 respectively flows to a node along one of the conduits 503, and further flows from this node to the air supply opening 5g along another conduit. This arrangement effectively ensures a normal operation of the air supply opening 5g configured for air supply for the rear battery anti-collision air cushions, as long as one of the air source devices 501 works, the air supply for the rear battery anti-collision air cushions can be realized.

Furthermore, the third air supply subsystem 530 includes two air source devices 501, two control valves 502, and a plurality of conduits 503. The third air supply subsystem 539 has six air supply openings (5h, 5i, 5j, 5k, 5l, 5m), the output ends of each control valve 502 comprises a first output end 5022, a second output end 5023, and a third output end 5024, the first output ends 5022 of the two control valves 502 are respectively communicated with two air supply openings 5h and 5i (which are configured for air supply for an air cushion 5400) of the six air supply openings; the second output ends 5023 of the two control valves 502 are respectively communicated with another two air supply openings 5j and 5k (which are configured for air supply for sealing the front and rear cabin doors of the electric vehicle) of the six air supply openings, and the air supply openings 5j and 5k inflate inner cavities of the airbag-type sealing strips 5500 so as to realize the sealing of the front and rear cabin doors. Two first air pipes 504 are connected between the third output ends 5024 of the two control valves 502, each first air pipe 504 is connected with one of the conduits 503, and the terminating ends of the two conduits 503 connected with the two first air pipes 504 form the last two air supply openings 5*l* and 5*m* (which are configured for dust removal for connectors of the power batteries) of the six air supply openings.

Furthermore, an inner side of the frame system 2 is provided with a plurality of cavities 5301 extending along a contour of the frame system 2, wherein one of the cavities 5301 forms the first air pipes 504. The cavities 5301 arranged in the frame system 2 have different functions, for example, they can accommodate electric cables, serve as air passages with different functions, transmit brake oil, and so on. This structure utilizes the space in the electric vehicle effectively, and can realize the effect of air passages without adding extra pipes. Particularly, the cavities 5301 extend along the contour of the frame system 2, the contour of the frame system 2 is in a closed shape, and the first air pipes 504 are in closed shapes too. A transverse section of each cavity 5301 is substantially rectangular so as to facilitate machining and shaping of the frame system 2.

Furthermore, each of the air source devices 501 is a high-pressure blower, and each of the control valves 502 is a pneumatic direction valve. A high-pressure blower is a machine using input mechanical energy to increase a gas pressure and exhaust gas, a function of a pneumatic directional valve is to receive electric signals of a controller and thereby switch directions of air flows, and adopting the combination of the high-pressure blower and the pneumatic directional valve can meet the independent air supply requirements of many positions. Axes of the high-pressure blowers of the second air supply subsystem 520 and axes of the high-pressure blowers of the third air supply subsystem 539 are all perpendicular to the plane where the frame system 2 is located, such that in a vertical direction the electric vehicle only needs less space for mounting the high-pressure blowers. The high-pressure blowers and the pneumatic directional valves of the third air supply subsystem are classified into two groups, which are respectively mounted at positions of two sides of the middle part of the electric vehicle.

Furthermore, the fourth air supply subsystem 540 includes an air source device 501 and a plurality of conduits 503, the node is connected in series with a plurality of second air pipes 505, each second air pipe 505 is respectively connected with one of the conduits 503, and the terminating ends of the conduits 503 form air supply openings 5*n* and 5*o* (which are configured for air supply for the pneumatic springs of the front cabin door of the electric vehicle). An inner side of the frame system 2 is provided with a plurality of cavities 5301 extending along a contour of the frame system 2, wherein one of the cavities 5301 forms the second air pipes 505. The fourth air supply subsystem 540 is controlled by the controller and configured for air supply for ascending and descending of the pneumatic springs of the front cabin door, and can adjust the ascending and descending speeds; in combination with hinge structures, the fourth air supply subsystem 540 can realize opening and closing controls for the front cabin door of the electric vehicle. The pneumatic springs are free pneumatic springs, which mainly provide a supporting function; each free pneumatic spring has only the shortest position and the longest position, and cannot automatically stop during a stroke. In this embodiment, the node is connected in series with two second air pipes 505, each second air pipe 505 is respectively connected with a conduit 503, and the terminating ends of the two conduits 503 form the two air supply openings 5*n* and 5*o*, which inflate and exhaust the two pneumatic springs of the front cabin door of the electric vehicle simultaneously, such that the opening and closing controls for the front cabin door are realized.

Furthermore, the fifth air supply subsystem 550 includes an air source device 501 and a plurality of conduits 503, the node is connected in series with a plurality of third air pipes 506, each third air pipe 506 is respectively connected with one of the conduits 503, and the terminating ends of the conduits 503 form air supply openings 5*p* and 5*q* (which are configured for air supply for the pneumatic springs of the rear cabin door of the electric vehicle). An inner side of the frame system 2 is provided with a plurality of cavities 5301 extending along a contour of the frame system 2, wherein one of the cavities 5301 forms the third air pipes 506. The fifth air supply subsystem 550 is controlled by the controller and configured for air supply for ascending and descending of the pneumatic springs of the rear cabin door, and can adjust the ascending and descending speeds; in combination with hinge structures, the fifth air supply subsystem 550 can realize opening and closing controls for the rear cabin door of the electric vehicle. In this embodiment, the node is connected in series with two third air pipes 506, each third air pipe 506 is respectively connected with a conduit 503, and the terminating ends of the two conduits 503 form the two air supply openings 5*p* and 5*q*, which inflate and exhaust the two pneumatic springs of the rear cabin door of the electric vehicle simultaneously, such that the opening and closing controls for the rear cabin door are realized. The fourth air supply subsystem 540 and the fifth air supply subsystem 550 can work synchronously, and can also work asynchronously; correspondingly, different opening modes of the cabin doors of the electric vehicle are realized.

Figure 35:
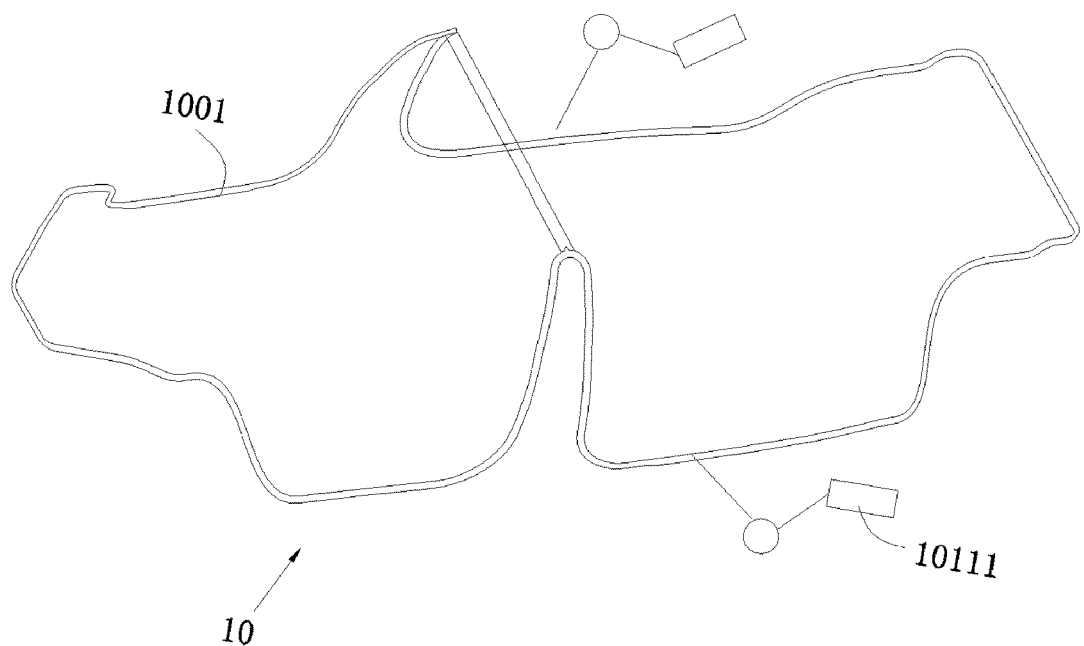
FIG. 35 is a schematic view of a sealing system provided by an embodiment of the present invention.

The electric vehicle provided by an embodiment of the present invention further comprises a sealing system 10 configured for sealing the electric vehicle, as shown in FIG. 35, an example of the sealing system 10 provided by this embodiment includes a sealing pipe 1001 configured to seal the clearance between the car doors and the chassis, the sealing pipe 1001 is fixedly mounted on the chassis and located at positions corresponding to the car doors. The sealing pipe 1001 is provided therein with a hollow passage 10011. The sealing system 10 further includes an air source communicating with the hollow passage 10011 of the sealing pipe 1001, the air source is connected with an electric control module arranged in the chassis, and after the car doors are closed, the electric control module controls the air source to inflate the sealing pipe 1001 such that the sealing pipe 1001 expands.

The aforesaid sealing system 10 is provided with the sealing pipe 1001 between the car doors and the chassis, and uses the air source connected with the sealing pipe 1001 to inflate the sealing pipe 1001, such that the volume of the sealing pipe 1001 expands. The sealing pipe 1001 with the increased volume makes the clearance between the chassis and the car doors be blocked. In this way, the contacting surface packaging the sides of the car doors is larger, and since the sealing pipe 1001 is filled with air, the sealing pipe 1001 generates a big elastic deformation, such that the sealing effect is better, and the sealing performance of the car doors are not prone to be affected by aging of the pipe body. Particularly, the air source in this embodiment can share the air source devices of the aforesaid air supply system.

Figure 36:
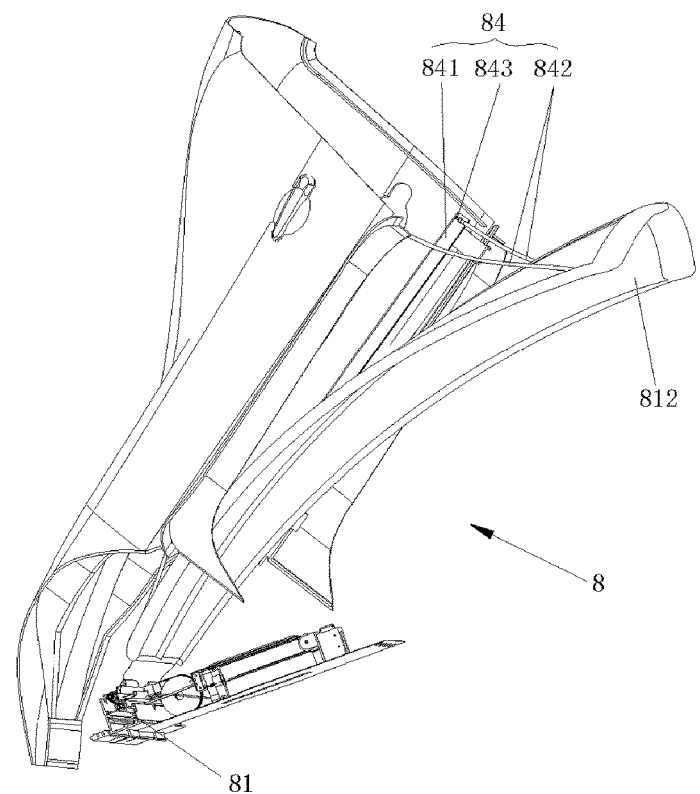
FIG. 36 is a schematic view of an awning shelter system provided by an embodiment of the present invention.

As shown in FIG. 36, the electric vehicle provided by the present invention further comprises an awning shelter system 8, which is configured to keep rain out when the car doors are opened upwards, and includes an awning unfolding and receiving device 81 mounted on the crossbeams of the frame system and located under the card doors. The awning unfolding and receiving device 81 includes a roller, a piece of awning cloth rolled on the roller, and a driving assembly driving the roller to rotate, and both the roller and the driving assembly are fixed on the crossbeams of the frame system. Particularly, the driving assembly can be a structure which combines a motor with a gear transmission system. Since the area that requires keeping rain out is large, the area of the unfolded awning cloth 812 needs to be large; however, in order to reduce the area occupied by the awning cloth 812 and improve the appearance of the vehicle, the awning cloth 812 is arranged in such a way that the awning cloth 812 becomes a folded state when it does not need to be unfolded and can be extended and opened when it needs to be used. Therefore, the awning unfolding and receiving device 81 is designed to include the roller, the awning cloth 812, and the driving assembly driving the roller to rotate, one end of the awning cloth 812 is fixedly connected on the roller, and another end of the awning cloth 812 is a free end and can extend freely. In this way, the driving assembly drives the roller to rotate and realizes the function of folding or unfolding the awning cloth 812, such that the structural compactness and the grade of the vehicle are improved. The crossbeams of the frame system are connected with supporting boards (not shown in the drawings), the awning shelter system 8 further includes an awning cloth driving device arranged on the supporting boards and configured to drive the awning cloth 812 rolled on the roller to extend outwards, and a guide assembly 84 configured to guide the movement of the awning cloth 812 is arranged between the awning cloth 812 and the car doors. Driving the awning cloth 812 to extend is realized by the awning cloth driving device, the driving assembly arranged on the crossbeams of the frame system can release the folded awning cloth 812 when the awning cloth 812 is unfolded, thereby providing an auxiliary function; the rolling of the awning cloth 812 is realized by the driving assembly, at this time, the awning cloth driving device provides a function of facilitating pulling the awning cloth 812 back. Moreover, the driving assembly 84 arranged between the awning cloth 812 and the car doors can provide a guide function when the awning cloth 812 is being unfolded or rolled, such that it is ensured that the awning cloth 812 can be successfully unfolded or rolled, and the awning cloth 812 can be unfolded or rolled in predetermined shapes, thereby ensuring the reliability of use.

The driving assembly 84 includes two sliding rails 841 arranged on a car door oppositely and two awning drawbars 842 each having one end connected on the awning cloth 812 and another end connected on one of the sliding rails 841, and the end of each awning drawbar 842 connected to the sliding rail 841 is provided with a pulley 843. A transverse section of each sliding rail 841 is in a shape of "a notched circle", when the pulley 843 is arranged in the sliding rail 841, not only can the pulley 843 freely move along the sliding rail 841 to provide a guide function for the unfolding or rolling of the awning cloth 812, but also the sliding rail 841 in the shape of "a notched circle" can prevent the pulley 843 therein from falling out, and thus the pulley 843 does not need to be limited additionally. The awning drawbars 842 can not only provide the function of transmission guide, but also provide the function of stabilizing the unfolded shape of the awning cloth 812 after the awning cloth 812 is unfolded.

Of course, the electric vehicle provided by the present invention further comprises a temperature control system. The temperature control system can include a vehicle-mounted air conditioning and a heat exchange box, and can adopts a vehicle air conditioning system in the prior art. Furthermore, in order to make the power batteries to work in an appropriate temperature condition and prolong their service lives, a heat exchange box can be additionally mounted on the assembly casings of the power batteries, such that the power batteries always keep working in an appropriate temperature condition.

The above contents are only preferred embodiments of the present invention, and are not intended to limit the present invention. Any modification, equivalent replacement or improvement made within the spirit and principle of the present invention should be included in the protection scope of the present invention.

What is claimed is:

1. An electric vehicle, comprising:
a chassis, a vehicle body arranged on the chassis, and a power battery arranged on the chassis and configured to provide electric power, wherein the chassis comprises a frame system, a steering motor damping system mounted on the frame system, a wheel system connected to the steering motor damping system, a steering system mounted on the frame system, and a braking system mounted on the frame system;
the wheel system comprises a left front wheel using a hub motor, a left rear wheel using a hub motor, a right front wheel using a hub motor, and a right rear wheel using a hub motor;
the steering motor damping system includes a left front steering damping motor, a right front steering damping motor, a left rear steering damping motor, and a right rear steering damping motor; the left front steering damping motor and the right front steering damping motor are respectively mounted at left and right sides of a front end of the frame system, and the left rear steering damping motor and the right rear steering damping motor are respectively mounted at left and right sides of a rear end of the frame system;
the left front wheel is connected with the left front steering damping motor; the right front wheel is connected with the right front steering damping motor; the left rear wheel is connected with the left rear steering damping motor; and the right rear wheel is connected with the right rear steering damping motor;
wherein, the steering system includes a steering wheel, a steering transmission device configured to transmit a rotation angle of the steering wheel, a left rotating wheel configured to adjust a rotation angle of the left front wheel, a right rotating wheel configured to adjust a rotation angle of the right front wheel, and a steering device configured to control rotation angles of the left rotating wheel and the right rotating wheel; the steering wheel is connected to one end of the steering transmission device, and another end of the steering transmission device engages with the steering device; the left rotating wheel and the right rotating wheel are respectively located at the two ends of the steering device, the left rotating wheel is connected to the left front steering damping motor, and the right rotating wheel is connected to the right front steering damping motor,
wherein, the vehicle body includes a passenger compartment and car doors arranged on the chassis, the car doors include a front cabin door and a rear cabin door configured to open and close the passenger compartment, and the front cabin door and the rear cabin door cover above the passenger compartment; a front end of the front cabin door is connected to the chassis by a first hinge assembly, and a rear end of the rear cabin door is connected to the chassis by a second hinge assembly; the electric vehicle further includes a first turning mechanism configured to control the front cabin door to turn outwards around the first hinge assembly and a second turning mechanism configured to control the rear cabin door to turn outwards around the second hinge assembly.

2. The electric vehicle according to claim 1, wherein, the front cabin door includes a first cover and two first side doors connected to two sides of the front cover respectively, and the rear cabin door includes a rear cover and two rear side doors connected to two sides of the rear cover respectively; the electric vehicle further includes a first linkage turning device turning the front side doors through a linkage upon turning the front cabin door and a second linkage turning device turning the rear side doors through a linkage upon turning the rear cabin door.

3. The electric vehicle according to claim 2, wherein, the first linkage turning device includes a third hinge assembly connected between the front side doors and the front cover and a third turning mechanism connected between the front side doors and the chassis and driving the front side doors to turn around the third hinge assembly respectively when the front cabin door turns; the second linkage turning device includes a fourth hinge assembly connected between the rear side doors and the rear cover and a fourth turning mechanism connected between the rear side doors and the chassis and driving the rear side doors to turn around the fourth hinge assembly respectively when the rear cabin door turns.

4. The electric vehicle according to claim 1, wherein, the first hinge assembly includes a first hinge seat arranged at the chassis and a first hinge member of which an end is arranged in and rotatable relative to the first hinge seat, and another end of the first hinge member is fixed on the front cabin door; the second hinge assembly includes a second hinge seat arranged at the chassis and a second hinge member of which an end is arranged in and rotatable relative to the second hinge seat, and another end of the second hinge member is fixed on the rear cabin door.

5. The electric vehicle according to claim 1, wherein, the first turning mechanism includes at least one first pneumatic spring of which two ends are respectively connected on the front cabin door and the chassis via gimbals and a first air pump configured to inject high-pressure air into the first pneumatic spring so as to enable the first pneumatic springs to drive the front cabin door to turn; the second turning mechanism includes at least one second pneumatic spring of which two ends are respectively connected to the rear cabin door and the chassis via gimbals and a second air pump configured to inject high-pressure air into the second pneumatic spring so as to enable the second pneumatic spring to drive the rear cabin door to turn.

6. The electric vehicle according to claim 1, wherein, the front cabin door and/or the rear cabin door is/are provided with solar panels.

7. The electric vehicle according to claim 1, wherein, the electric vehicle further comprises a sealing system, the sealing system includes a sealing pipe arranged between the car doors and the chassis and configured to seal the clearance between the car doors and the chassis, and the sealing pipe is provided therein with a hollow passage; the sealing system further includes an air source communicating with the hollow passage of the sealing pipe and configured to inflate the sealing pipe such that the sealing pipe expands.

8. The electric vehicle according to claim 1, wherein, the electric vehicle further comprises an awning shelter system, which is configured to keep rain out when the car doors are opened upwards, and includes an awning unfolding and receiving device mounted on the crossbeams of the frame system and located under the card doors; the awning unfolding and receiving device includes a roller, a piece of awning cloth rolled on the roller, and a driving assembly driving the roller to rotate, and both the roller and the driving assembly are fixed on the crossbeams of the frame system; the crossbeams of the frame system are connected with supporting boards, the awning shelter system further includes an awning cloth driving device arranged on the supporting boards and configured to drive the awning cloth rolled on the roller to extend outwards, and a guide assembly configured to guide the movement of the awning cloth is arranged between the awning cloth and the car doors.

9. An electric vehicle, comprising:
a chassis, a vehicle body arranged on the chassis, and a power battery arranged on the chassis and configured to provide electric power, wherein the chassis comprises a frame system, a steering motor damping system mounted on the frame system, a wheel system connected to the steering motor damping system, a steering system mounted on the frame system, and a braking system mounted on the frame system;
the wheel system comprises a left front wheel using a hub motor, a left rear wheel using a hub motor, a right front wheel using a hub motor, and a right rear wheel using a hub motor;
the steering motor damping system includes a left front steering damping motor, a right front steering damping motor, a left rear steering damping motor, and a right rear steering damping motor; the left front steering damping motor and the right front steering damping motor are respectively mounted at left and right sides of a front end of the frame system, and the left rear steering damping motor and the right rear steering damping motor are respectively mounted at left and right sides of a rear end of the frame system;
the left front wheel is connected with the left front steering damping motor; the right front wheel is connected with the right front steering damping motor; the left rear wheel is connected with the left rear steering damping motor; and the right rear wheel is connected with the right rear steering damping motor;
wherein, the steering system includes a steering wheel, a steering transmission device configured to transmit a rotation angle of the steering wheel, a left rotating wheel configured to adjust a rotation angle of the left front wheel, a right rotating wheel configured to adjust a rotation angle of the right front wheel, and a steering device configured to control rotation angles of the left rotating wheel and the right rotating wheel; the steering wheel is connected to one end of the steering transmission device, and another end of the steering transmission device engages with the steering device; the left rotating wheel and the right rotating wheel are respectively located at the two ends of the steering device, the left rotating wheel is connected to the left front steering damping motor, and the right rotating wheel is connected to the right front steering damping motor,
wherein, the power battery includes a plurality of cells and a cell state collecting device, and the cells are mounted on the cell state collecting device.

10. An electric vehicle, comprising:
a chassis, a vehicle body arranged on the chassis, and a power battery arranged on the chassis and configured to provide electric power, wherein the chassis comprises a frame system, a steering motor damping system mounted on the frame system, a wheel system connected to the steering motor damping system, a steering system mounted on the frame system, and a braking system mounted on the frame system;

the wheel system comprises a left front wheel using a hub motor, a left rear wheel using a hub motor, a right front wheel using a hub motor, and a right rear wheel using a hub motor;

the steering motor damping system includes a left front steering damping motor, a right front steering damping motor, a left rear steering damping motor, and a right rear steering damping motor; the left front steering damping motor and the right front steering damping motor are respectively mounted at left and right sides of a front end of the frame system, and the left rear steering damping motor and the right rear steering damping motor are respectively mounted at left and right sides of a rear end of the frame system;

the left front wheel is connected with the left front steering damping motor; the right front wheel is connected with the right front steering damping motor; the left rear wheel is connected with the left rear steering damping motor; and the right rear wheel is connected with the right rear steering damping motor;

wherein, the steering system includes a steering wheel, a steering transmission device configured to transmit a rotation angle of the steering wheel, a left rotating wheel configured to adjust a rotation angle of the left front wheel, a right rotating wheel configured to adjust a rotation angle of the right front wheel, and a steering device configured to control rotation angles of the left rotating wheel and the right rotating wheel; the steering wheel is connected to one end of the steering transmission device, and another end of the steering transmission device engages with the steering device; the left rotating wheel and the right rotating wheel are respectively located at the two ends of the steering device, the left rotating wheel is connected to the left front steering damping motor, and the right rotating wheel is connected to the right front steering damping motor, wherein, the electric vehicle further comprises a vehicle battery clamping device, which is mounted on the frame system to clamp the power battery, and includes: a fixing beam fixedly arranged on the frame system; a handle shaft rotatably arranged on the fixing beam, wherein the handle shaft is fixedly provided with a winding pulley set; a wirerope winding on the winding pulley set; a front shaft of which an upper end is rotatably connected to the fixing beam and a lower end is provided with a front snap board, wherein the front snap board is perpendicular to the front shaft; a rear shaft of which an upper end is rotatably connected to the frame system and a lower end is provided with a rear snap board, wherein the rear snap board is perpendicular to the rear shaft; a synchronous belt configured to synchronously drive the front shaft and the rear shaft to rotate, of which two ends are respectively coiled on the front shaft and the rear shaft; a guide pulley assembly configured to change the transmission direction of the wirerope, wherein the guide pulley assembly is arranged on the fixing beam, the wirerope runs through the guide pulley assembly, and two ends of the wirerope are respectively connected to the synchronous belt; wherein, the fixing beam, the front shaft, and the front snap board cooperatively form an H-shaped clamping structure, and the rear snap board and the rear shaft cooperatively form an inverted T-shaped clamping structure; front and rear ends of two power batteries are respectively clamped at two sides of the H-shaped clamping structure and at two sides of the inverted T-shaped clamping structure.

11. The electric vehicle according to claim 10, wherein, two ends of the handle shaft are respectively provided with handles that are foldable and retractable, and each handle is perpendicular to the handle shaft.

12. The electric vehicle according to claim 11, wherein, the fixing beam is provided with a supporting frame configured to support the handle shaft, and the handle shaft is rotatably arranged on the supporting frame.

13. The electric vehicle according to claim 10, wherein, the guide pulley assembly includes a frame and a plurality of guide pulleys configured to change the transmission direction of the wirerope, the frame is arranged on the fixing beam, the guide pulleys are arranged in the frame, and the wirerope which runs through the guide pulley assembly is coiled on the guide pulleys.

14. The electric vehicle according to claim 10, wherein, a front gear is sheathed on the front shaft, and a rear gear is sheathed on the rear shaft, the synchronous belt is a flexible rack, and the flexible rack is a closed loop and winds on the front gear and the rear gear.

15. The electric vehicle according to claim 10, wherein, two synchronous lock members are fixedly clamped on the synchronous belt, the two synchronous lock members are respectively clamped at two sides of the synchronous belt, and two ends of the wirerope are respectively connected with the two synchronous lock members.

16. The electric vehicle according to claim 10, wherein, two ends of the fixing beam are respectively provided with front clamping pieces with elasticity, and the front clamping pieces clamps outer sides of the power batteries; the frame system is provided with two rear clamping pieces with elasticity, and the rear clamping pieces clamps outer sides of the power batteries too.

17. The electric vehicle according to claim 16, wherein, a distal end of each of the two front clamping pieces is provided with a front bayonet allowing the front snap board to engage, and the frame system is provided with a front bayonet lock member that can lock the front snap board in the front bayonet; a distal end of each of the two rear clamping pieces is provided with a rear bayonet allowing the rear snap board to engage, and the frame system is provided with a rear bayonet lock member that can lock the rear snap board in the rear bayonet.

18. The electric vehicle according to claim 17, wherein, the front bayonet lock member includes a front lock sleeve, a front pressing block, and a front lock block that can retract into the front lock sleeve upon being pressed by the front pressing block, and both the front pressing block and the front lock block are arranged in the front lock sleeve; the rear bayonet lock member includes a rear lock sleeve, a rear pressing block, and a rear lock block that can retract into the rear lock sleeve upon being pressed by the rear pressing block, and both the rear pressing block and the rear lock block are arranged in the rear lock sleeve.

19. An electric vehicle, comprising:
a chassis, a vehicle body arranged on the chassis, and a power battery arranged on the chassis and configured to provide electric power, wherein the chassis comprises a frame system, a steering motor damping system mounted on the frame system, a wheel system connected to the steering motor damping system, a steering system mounted on the frame system, and a braking system mounted on the frame system;

the wheel system comprises a left front wheel using a hub motor, a left rear wheel using a hub motor, a right front wheel using a hub motor, and a right rear wheel using a hub motor;

the steering motor damping system includes a left front steering damping motor, a right front steering damping motor, a left rear steering damping motor, and a right rear steering damping motor; the left front steering damping motor and the right front steering damping motor are respectively mounted at left and right sides of a front end of the frame system, and the left rear steering damping motor and the right rear steering damping motor are respectively mounted at left and right sides of a rear end of the frame system;

the left front wheel is connected with the left front steering damping motor; the right front wheel is connected with the right front steering damping motor; the left rear wheel is connected with the left rear steering damping motor; and the right rear wheel is connected with the right rear steering damping motor;

wherein, the steering system includes a steering wheel, a steering transmission device configured to transmit a rotation angle of the steering wheel, a left rotating wheel configured to adjust a rotation angle of the left front wheel, a right rotating wheel configured to adjust a rotation angle of the right front wheel, and a steering device configured to control rotation angles of the left rotating wheel and the right rotating wheel; the steering wheel is connected to one end of the steering transmission device, and another end of the steering transmission device engages with the steering device; the left rotating wheel and the right rotating wheel are respectively located at the two ends of the steering device, the left rotating wheel is connected to the left front steering damping motor, and the right rotating wheel is connected to the right front steering damping motor, wherein, the electric vehicle further comprises a vehicle air supply system, the vehicle air supply system includes an air source device having an air inlet and an air outlet, a control valve having one input end and a plurality of output ends and configured to switch directions of air flows, a controller sending electric signals to the control valve or the air source device to switch working states, and a plurality of conduits each having a start end and a terminating end; the air source device, the control valve, and the conduits form a first type of air supply system, wherein the air outlet of the air source device is connected to the input end of the control valve by one of the conduits, the start ends of the plurality of conduits are respectively connected with the plurality of output ends of the control valve, and the terminating ends of the plurality of conduits form the air supply opening; the air source device and the conduits form a second type of air supply system, wherein the start end of one of the conduits is connected with the air outlet of the air source device and the terminating end of the conduit forms a node, this node is connected in series with a plurality of conduits respectively, and the terminating ends of the plurality of conduits form the air supply opening.

20. The electric vehicle according to claim 19, wherein, the first type of air supply system comprises a first air supply subsystem mounted at a front part of the frame system, a second air supply subsystem mounted at a rear part of the frame system, and a third air supply subsystem mounted at a middle part of the frame system; the second type of air supply system comprises a fourth air supply subsystem mounted at a front part of the frame system and a fifth air supply subsystem mounted at a rear part of the frame system; the first air supply subsystem, the second air supply subsystem, the third air supply subsystem, the fourth air supply system, and the fifth air supply system are all controlled by the controller.

21. The electric vehicle according to claim 20, wherein, the first air supply subsystem includes an air source device, a control valve, and a plurality of conduits; the first air supply subsystem has four air supply openings, the output ends of the control valve comprises a first output end, a second output end, and a third output end, the first output end of the control valve is communicated with two air supply openings of the four air supply openings, and the second output end and the third output end of the control valve are respectively communicated with the other two air supply openings of the four air supply openings.

22. The electric vehicle according to claim 20, wherein, the second air supply subsystem includes two air source devices, two control valves, and a plurality of conduits; the second air supply subsystem has three air supply openings, the output ends of each control valve comprises a first output end and a second output end, the first output ends of the two control valves are respectively communicated with two air supply openings of the three air supply openings, and the second output ends of the two control valves are communicated with each other and further communicated with the last one of the three air supply openings.

23. The electric vehicle according to claim 20, wherein, the third air supply subsystem includes two air source devices, two control valves, and a plurality of conduits; the third air supply subsystem has six air supply openings, the output ends of each control valve comprises a first output end, a second output end, and a third output end, the first output ends of the two control valves are respectively communicated with two air supply openings of the six air supply openings, the second output ends of the two control valves are respectively communicated with another two air supply openings of the six air supply openings; two first air pipes are connected between the third output ends of the two control valves, each first air pipe is connected with one of the conduits, and the terminating ends of the two conduits form the last two air supply openings of the six air supply openings.

24. The electric vehicle according to claim 20, wherein, the fourth air supply subsystem includes an air source device and a plurality of conduits, the node is connected in series with a plurality of second air pipes, each second air pipe is respectively connected with one of the conduits, and the terminating ends of the conduits form air supply openings; an inner side of the frame system is provided with a plurality of cavities extending along a contour of the frame system, and one of the cavities forms the second air pipes.

25. The electric vehicle according to claim 20, wherein, the fifth air supply subsystem includes an air source device and a plurality of conduits, the node is connected in series with a plurality of third air pipes, each third air pipe is respectively connected with one of the conduits, and the terminating ends of the conduits form air supply openings; an inner side of the frame system is provided with a plurality of cavities extending along a contour of the frame system, and one of the cavities forms the third air pipes.

26. The electric vehicle according to claim 19, wherein, an inner side of the frame system is provided with a plurality of cavities extending along a contour of the frame system, and one of the cavities forms the first air pipes.

\* \* \* \* \*